(12) United States Patent
Han et al.

(10) Patent No.: US 11,465,274 B2
(45) Date of Patent: Oct. 11, 2022

(54) MODULE TYPE HOME ROBOT

(71) Applicant: LG ELECTRONICS INC., Seoul (KR)

(72) Inventors: Eunhyae Han, Seoul (KR); Yoonho Shin, Seoul (KR); Seungwoo Maeng, Seoul (KR); Sanghyuck Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 1006 days.

(21) Appl. No.: 16/088,057

(22) PCT Filed: Mar. 9, 2017

(86) PCT No.: PCT/KR2017/002602
§ 371 (c)(1),
(2) Date: Sep. 24, 2018

(87) PCT Pub. No.: WO2018/151368
PCT Pub. Date: Aug. 23, 2018

(65) Prior Publication Data
US 2020/0298394 A1   Sep. 24, 2020

(30) Foreign Application Priority Data
Feb. 20, 2017   (KR) ................ 10-2017-0022292

(51) Int. Cl.
*B25J 9/00* (2006.01)
*H04N 5/232* (2006.01)
(Continued)

(52) U.S. Cl.
CPC ............. *B25J 9/0003* (2013.01); *B25J 9/08* (2013.01); *B25J 11/0005* (2013.01);
(Continued)

(58) Field of Classification Search
CPC ........ B25J 9/0003; B25J 9/08; B25J 11/0005; B25J 13/006; B25J 13/087; B25J 19/02;
(Continued)

(56) References Cited

U.S. PATENT DOCUMENTS 8,077,963 B2 * 12/2011 Wang ..................... A61B 34/70
382/153
10,357,881 B2 * 7/2019 Faridi ................ H04N 5/23219
(Continued)

FOREIGN PATENT DOCUMENTS

| CN | 103093704 | 5/2013 |
| CN | 204069288 | 12/2014 |

(Continued)

OTHER PUBLICATIONS

PCT International Application No. PCT/KR2017/002602, International Search Report dated Nov. 17, 2017, 3 pages.
(Continued)

*Primary Examiner* — B M M Hannan
(74) *Attorney, Agent, or Firm* — Lee Hong Degerman Kang Waimey

(57) ABSTRACT

A module type home robot is provided. The module type home robot includes a device module coupling unit coupled to a device module, an input unit receiving a user input, an output unit outputting voice and images, a sensing unit sensing a user, and a control unit sensing a trigger signal, activating the device module or the output unit according to the sensed trigger signal, and controlling the module type home robot to perform an operation mapped to the sensed trigger signal. The trigger signal is a user proximity signal, a user voice signal, a user movement signal, a specific time sensing signal or an environment change sensing signal.

18 Claims, 20 Drawing Sheets

(51) Int. Cl.
| | |
|---|---|
| *H04N 9/31* | (2006.01) |
| *B25J 9/08* | (2006.01) |
| *B25J 11/00* | (2006.01) |
| *B25J 13/00* | (2006.01) |
| *B25J 13/08* | (2006.01) |
| *B25J 19/02* | (2006.01) |
| *G10L 15/22* | (2006.01) |
| *G10L 15/26* | (2006.01) |
| *H02J 7/02* | (2016.01) |
| *H04L 12/28* | (2006.01) |

(52) U.S. Cl.
CPC ............ *B25J 13/006* (2013.01); *B25J 13/087* (2013.01); *B25J 19/02* (2013.01); *G10L 15/22* (2013.01); *G10L 15/26* (2013.01); *H02J 7/02* (2013.01); *H04N 5/23299* (2018.08); *H04N 9/3173* (2013.01); *H04L 12/2803* (2013.01); *H04L 2012/2841* (2013.01)

(58) Field of Classification Search
CPC ........ B25J 11/00; B25J 9/1661; B25J 9/1679; B25J 19/005; B25J 19/023; B25J 19/061; G10L 15/22; G10L 15/26; H02J 7/02; H04N 5/23299; H04N 9/3173; H04L 12/2803; H04L 2012/2841
USPC ................................. 700/245, 246, 257, 258
See application file for complete search history.

(56) References Cited

U.S. PATENT DOCUMENTS

| | | | | |
|---|---|---|---|---|
| 10,653,282 | B2* | 5/2020 | Song | .................... G05D 1/0242 |
| 2004/0019406 | A1* | 1/2004 | Wang | .................... H04N 7/142 |
| | | | | 700/231 |
| 2004/0098167 | A1* | 5/2004 | Yi | ......................... G06N 3/008 |
| | | | | 700/245 |
| 2005/0091684 | A1* | 4/2005 | Kawabata | ............... G10L 15/26 |
| | | | | 725/35 |
| 2005/0137747 | A1* | 6/2005 | Miro | ..................... G06N 3/008 |
| | | | | 318/568.12 |
| 2007/0192910 | A1 | 8/2007 | Vu et al. | |
| 2010/0185326 | A1 | 7/2010 | Choi et al. | |
| 2012/0209433 | A1 | 8/2012 | Rodriguez | |
| 2013/0226344 | A1* | 8/2013 | Wong | .................... B25J 9/1697 |
| | | | | 901/1 |
| 2014/0056028 | A1* | 2/2014 | Nichol | ...................... F21K 9/65 |
| | | | | 362/616 |
| 2014/0279733 | A1 | 9/2014 | Djugash | |
| 2014/0333666 | A1* | 11/2014 | Poulos | ............... G02B 27/0172 |
| | | | | 345/633 |
| 2016/0379107 | A1 | 12/2016 | Li et al. | |
| 2017/0172368 | A1* | 6/2017 | Chiu | .................... G05D 1/0022 |
| 2017/0203446 | A1* | 7/2017 | Dooley | .............. H04N 5/23206 |
| 2017/0361468 | A1* | 12/2017 | Cheuvront | ............ A47L 9/2805 |

FOREIGN PATENT DOCUMENTS

| | | | | |
|---|---|---|---|---|
| CN | 204180188 | | | 2/2015 |
| CN | 105563493 | | | 5/2016 |
| CN | 105856252 | A | * | 8/2016 |
| CN | 106335071 | | | 1/2017 |
| CN | 205950756 | | | 2/2017 |
| CN | 108270249 | A | * | 7/2018 |
| CN | 215457713 | U | * | 1/2022 |
| EP | 2492850 | | | 8/2012 |
| EP | 2778995 | | | 9/2014 |
| EP | 3109800 | | | 12/2016 |
| KR | 101016805 | | | 2/2011 |
| KR | 101066999 | | | 9/2011 |
| KR | 101523269 | | | 5/2015 |
| WO | 2017/012225 | | | 1/2017 |

OTHER PUBLICATIONS

The State Intellectual Property Office of the People's Republic of China Application Serial No. 201780033070.9, Office Action dated Nov. 3, 2021, 10 pages.
The State Intellectual Property Office of the People's Republic of China Application Serial No. 201780033070.9, Office Action dated Apr. 30, 2021, 9 pages.
European Patent Office Application Serial No. 17897001.8, Search Report dated Dec. 3, 2020, 8 pages.
The State Intellectual Property Office of the People's Republic of China Application Serial No. 201780033070 9, Office Action dated May 6, 2022, 11 pages.

* cited by examiner

FIG. 5
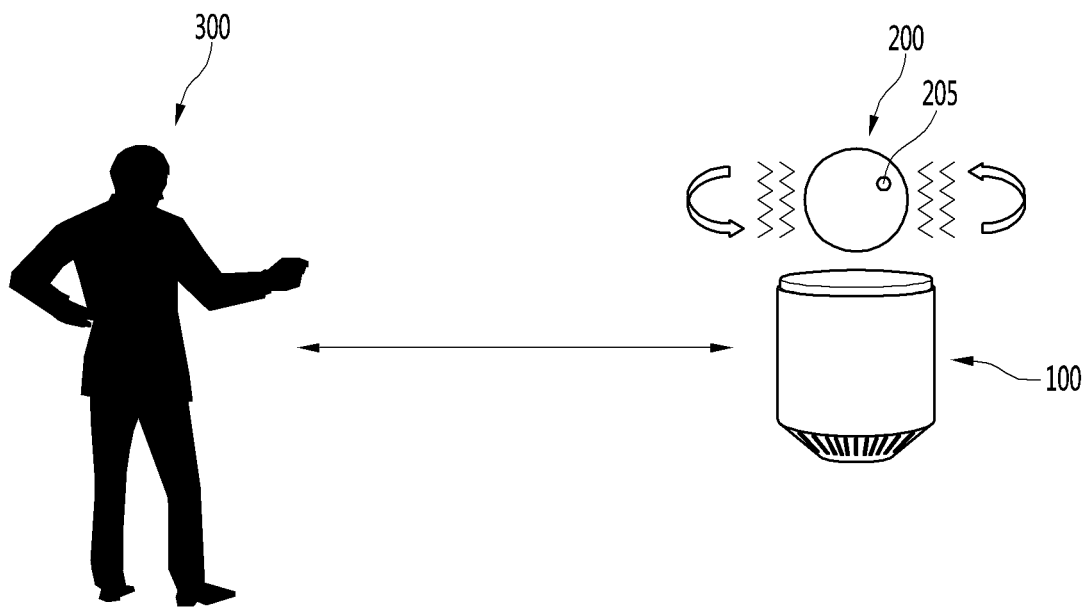
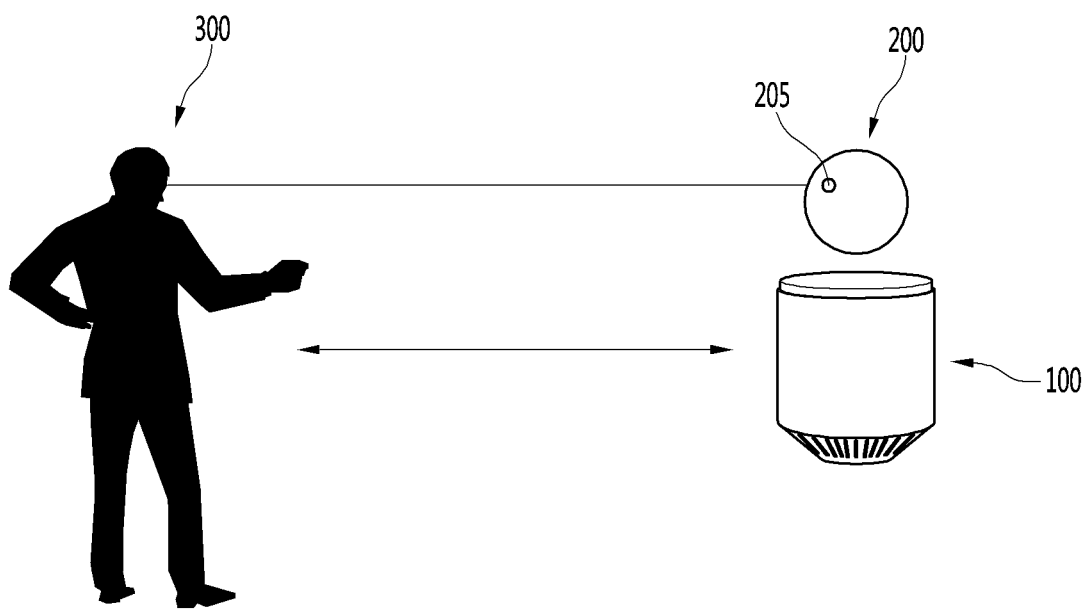

MODULE TYPE HOME ROBOT

CROSS-REFERENCE TO RELATED APPLICATIONS

This application is the National Stage filing under 35 U.S.C. 371 of International Application No. PCT/KR2017/002602, filed on Mar. 9, 2017, which claims the benefit of earlier filing date and right of priority to Korean Application No. 10-2017-0022292, filed on Feb. 20, 2017, the contents of which are all incorporated by reference herein in their entirety.

TECHNICAL FIELD

The present invention relates to a module type home robot and an operating method thereof.

DESCRIPTION OF THE RELATED BACKGROUND ART

Recently, various robots are being developed for home automation (HA). Home automation denotes that various accidents occurring in home are handled by using an automation system such as robots. For example, the automation system may be used for patrol and crime watch in home for security and safety of home. A home automation system may periodically patrol home and watch crimes in home by using a robot. When a specific event such as intrusion of an intruder occurs in home, a robot may perform patrol and crime watch to provide an appropriate countermeasure such as the report of the intruder.

The home automation denote that instead of a user, the automation system performs work occurring in home by using a robot. The automation system generally provides a service by using a home service robot.

As described above, the home automation is to provide a service by using a robot which performs a specific service.

Most of home robots developed until recently are produced as an embedded type so as to perform a specific function, and for this reason, users should unwillingly equip several home robots for fulfilling various functions.

Furthermore, if a robot is large is size, a user cannot easily move the robot to a desired environment and should move the robot in only a certain spatial area in home.

DISCLOSURE

Technical Problem

An aspect of the present invention provides consumers with a home robot for easily realizing a function desired by a user despite the purchase of one product.

Another aspect of the present invention is directed to provide a home robot which is automatically activated and performs an interaction with a user even without a separate input of the user.

Another aspect of the present invention is directed to provide a home robot which autonomously performs a necessary function even in an environment where there is no user in home.

Technical Solution

In a module type home robot according to an embodiment of the present invention, the module type home robot may be separated into a main body and a device module, the device module may be replaced, and different device modules may be replaced and may be applied to a plurality of functions.

Moreover, in the module type home robot according to an embodiment of the present invention, a proximity sensor or a voice recognition sensor may sense an ambient user in real time, and a plurality of functions may be automatically activated according to a trigger signal.

Moreover, the module type home robot according to an embodiment of the present invention may autonomously sense a user absence environment and may use some functions of a specific device module, such as a camera module, as functions for security.

Advantageous Effects

According to one embodiment of the various embodiments of the present invention, the module type home robot may be separated into the main body and the device module, the device module may be replaced, and different device modules may be replaced and used for various functions. Accordingly, the present invention provides consumers with a home robot for easily realizing a function desired by a user despite the purchase of one product.

According to another embodiment of the various embodiments of the present invention, the module type home robot may sense an ambient user in real time by using a proximity sensor or a voice recognition sensor and may automatically activate a plurality of functions according to a trigger signal, and thus, even without a separate input of the user, the module type home robot may be automatically activated and may perform an interaction with a user.

According to another embodiment of the various embodiments of the present invention, the module type home robot may autonomously sense a user absence environment to use, as a security function, some functions of a device module currently equipped therein, and thus, the module type home robot may autonomously perform a necessary function even in an environment where there is no user in home.

DESCRIPTION OF DRAWINGS

FIGS. 3 to 5 are diagrams for describing an example where a module type home robot according to the present invention recognizes a user to react.

BEST MODE

Figure 1A:
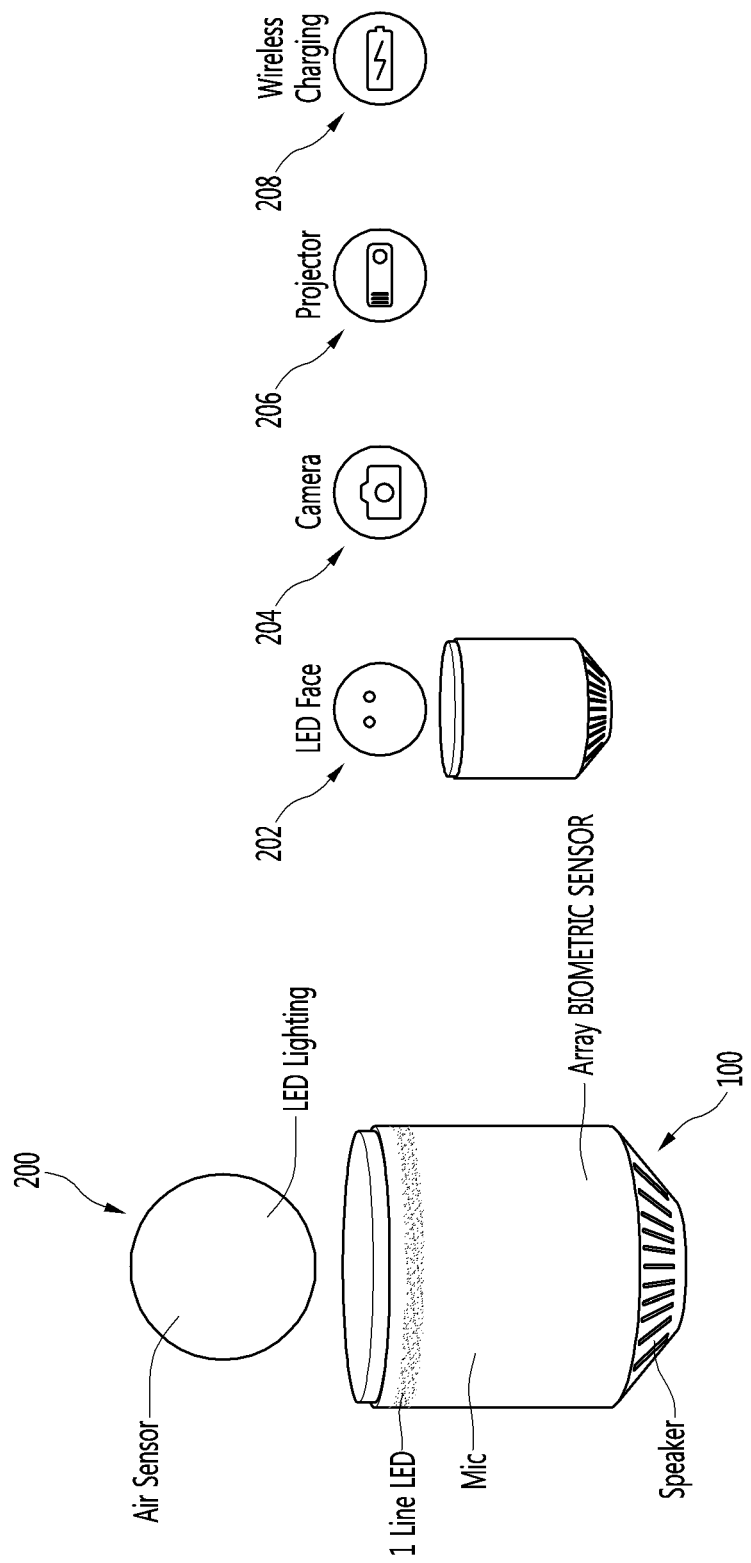
FIG. 1a is a diagram for describing an external appearance of a module type home robot according to the present invention.

Hereinafter, embodiments disclosed in the specification will be described in detail with reference to the accompanying drawings. The suffixes "module" and "unit" to elements used herein is assigned or used in consideration of easiness of description of the specification, and do not have a meaning or a role differentiated from each other. In describing the present invention, a detailed description of known techniques associated with the present invention unnecessarily obscure the gist of the present invention, it is determined that the detailed description thereof will be omitted. The present invention may have diverse modified embodiments, and thus, example embodiments are illustrated in the drawings and are described in the detailed description of the present invention. However, this does not limit the present invention within specific embodiments and it should be understood that the invention covers all the modifications, equivalents, and replacements within the idea and technical scope of the invention.

It will be understood that although the terms of first and second are used herein to describe various elements, these elements should not be limited by these terms. Terms are only used to distinguish one component from other components.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

As used herein, the singular forms "a", "an" and "the" are intended to include the plural forms as well, unless the context clearly indicates otherwise.

It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Hereinafter, a vehicle including a display device according to an embodiment of the present invention, and then, display devices according to embodiments of the present invention will be described in order.

FIG. 1A is a diagram for describing an external appearance of a module type home robot according to the present invention.

As illustrated in FIG. 1A, a module type home robot may include a main body 100 and a device module 200.

The main body 100 of the module type home robot may include an input/output (I/O) unit and various sensing units such as a light emitting diode (LED), a microphone, a speaker, and a human body sensor. A configuration of the main body 100 will be described below in detail with reference to FIG. 1B.

The device module 200 of the module type home robot may include device modules, having various functions, such as an LED module 202, a camera module 204, and projector module 206. The device modules 202, 204, and 206 described with reference to FIG. 1A are merely an embodiment, and it is obvious that all devices available in home may be manufactured as a module type and may be applied to the module type home robot.

Figure 1B:
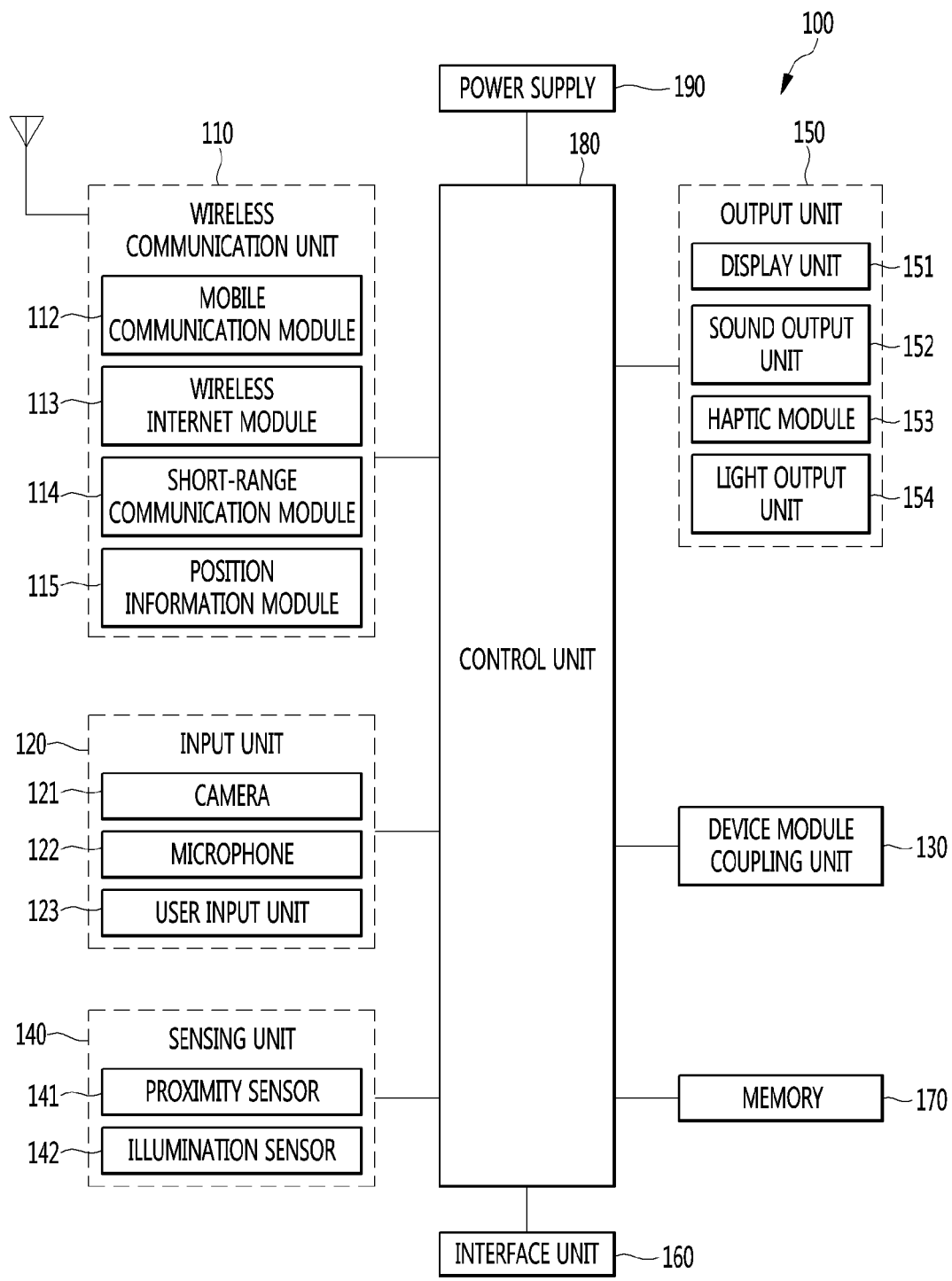
FIG. 1b is a block diagram for describing a main body according to the present invention.

FIG. 1B is a block diagram for describing the main body according to the present invention.

The main body 100 may include a wireless communication unit 110, an input unit 120, a sensing unit 140, an output unit 150, an interface unit 160, a memory 170, a control unit 180, and a power supply 190. The elements illustrated in FIG. 1B are not essential in implementing the main body, and thus, the main body described herein may more or fewer elements than the above-described elements.

In more detail, the wireless communication unit 110 of the elements may include one or more modules which enable wireless communication between the main body 100 and the device module, between the main body 100 and another main body 100, or between the main body 100 and an external server. Also, the wireless communication unit 110 may include one or more modules which connect the main body 100 to one or more networks.

The wireless communication unit 110 may include at least one of a mobile communication module 112, a wireless Internet module 113, a short range communication module 114, and a position information module 115.

The input unit 120 may include a camera 121 or an image input unit for inputting an image signal, a microphone 122 or au audio input unit for inputting an audio signal, a user input unit 123 (for example, a touch key, a push key (a mechanical key), etc.) for receiving information from a user. Voice data or image data collected through the input unit 120 may be analyzed and may be processed as a control command of the user.

The sensing unit 140 may include one or more sensors for sensing at least one of information about the main body, ambient environment information about a periphery of the main body, and user information. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, a photo sensor (for example, a camera (see 121)), a microphone (see 122), a battery gauge, an environment sensor (for example, a barometer, a hygrometer, a thermometer, a radiation sensor, a thermal sensor, a gas sensor, etc.), and a chemical sensor (for example, an electronic nose, a healthcare sensor, biometric sensor, etc.). The main body disclosed in the present specification may use a combination of pieces of information obtained through sensing by two or more sensors.

The output unit 150 is for generating an output associated with visual sensation, hearing sensation, tactual sensation, or the like and may include at least one of a display unit 151, a sound output unit 152, a haptic module 153, and a light output unit 154. The display unit 151 may configure a mutual layer structure along with a touch sensor or may be provided as one body with the touch sensor, thereby implementing a touch screen. The touch screen may function as the user input unit 123 which provides an input interface between the main body 100 and the user, and moreover, may provide an interface between the main body 100 and the user.

The interface unit 160 may act as a path for various kinds of external devices connected to the main body 100. The interface unit 160 may include at least one of a wired/wireless headset port, an external charger port, a wired/wireless data port, a memory card port, a port for connecting a device including an identification module, an audio I/O port, an audio I/O port, and an earphone port. The main body 100 may perform appropriate control associated with a connected external device according to the external device being connected to the interface unit 160.

Moreover, the memory 170 may store data that supports various functions of the main body 100. The memory 170 may store a number of application programs or applications driven in the main body 100 and pieces of data and commands for an operation of the main body 100. At least some of the application programs may be downloaded from the external server through wireless communication. Also, at least some of the application programs may be provided in the main body in releasing a product, for a basic function (for example, a call incoming function, a call transmission function, a message reception function, and a message transmission function). The application programs may be stored in the memory 170, installed in the main body 100, and executed to allow an operation (or a function) of the main body to be performed by the control unit 180.

The control unit 180 may generally control an overall operation of the main body 100, in addition to operations associated with the application programs. The control unit 180 may process a signal, data, information, and/or the like input or output through the above-described elements, or may execute the application programs stored in the memory 170, thereby providing or processing appropriate information or function to the user.

Moreover, the control unit 180 may control at least some of the elements described above with reference to FIG. 1B, for executing the application programs stored in the memory 170. Furthermore, the control unit 180 may combine and operate two or more of the elements included in the main body 100, for executing the application programs.

According to the present invention, the control unit 180 may acquire or sense a trigger signal, activate the device module 200 or the output unit 150 according to the trigger signal, and control the module type home robot to perform an operation mapped to the trigger signal. For example, the trigger signal includes at least one of a user proximity signal, a user voice signal, a user movement signal, a specific time sensing signal, and an environment change sensing signal. The at least one of the signals will be described later in detail.

The power supply 190 may be supplied with an external power or an internal power to supply power to each of the elements included in the main body 100 according to control by the control unit 180. The power supply 190 may include a battery, and the battery may be an internal battery or a replaceable battery.

At least some of the elements may operate in cooperation with each other for realizing an operation, control or a control method of the main body according to various embodiments described below. Also, the operation, control or control method of the main body may be implemented in the main body by driving at least one application program stored in the memory 170.

Hereinafter, before describing various embodiments implemented through the above-described main body 100, the above-described elements will be described in more detail with reference to FIG. 1.

To first describe the wireless communication unit 110, the mobile communication module 112 of the wireless communication unit 110 may transmit or receive at least one wireless signal to or from a base station, an external terminal, an external server over a mobile communication network established based on technology standards or communication scheme (for example, global system for mobile communication (GSM), code division multi access (CDMA), code division multi access 2000 (CDMA2000), enhanced voice-data optimized or enhanced voice-data only (EV-DO), wideband CDMA (WCDMA), high speed downlink packet access (HSDPA), high speed uplink packet access (HSUPA), long term evolution (LTE), long term evolution-advanced (LTE-A), etc.) for mobile communication.

The wireless signal may include a voice call signal, a video call signal, or various types of data based on transmission/reception of letter/multimedia message.

The wireless Internet module 113 may denote a module for wireless Internet access and may be embedded in or provided outside the main body 100. The wireless Internet module 113 may be configured to transmit or receive a wireless signal over a communication network based on wireless Internet technologies.

The wireless Internet technologies may include, for example, wireless LAN (WLAN), wireless-fidelity (Wi-Fi), Wi-Fi direct, digital living network alliance (DLNA), wireless broadband (WiBro), world interoperability for microwave access (WiMAX), high speed downlink packet access (HSDPA), high speed uplink packet access (HSUPA), long term evolution (LTE), long term evolution-advanced (LTE-A), etc., and the wireless Internet module 113 may transmit or receive data according to at least one wireless Internet technology within a range including Internet technology in addition to the above-described Internet technologies.

In terms of wireless Internet access based on WiBro, HSDPA, HSUPA, GSM, CDMA, WCDMA, LTE, or LTE-A being made over a mobile communication network, the wireless Internet module 113 for performing the wireless Internet access over the mobile communication network can be understood as one type of the mobile communication module 112.

The short range communication module 114 is for short range communication and may support the short range communication by using at least one of Bluetooth™, radio frequency identification (RFID), infrared data association (IrDA), ultra-wideband-(UWB), ZigBee, near field communication (NFC), Wi-Fi, Wi-Fi direct, wireless universal serial bus (Wireless USB) technologies. The short range communication module 114 may support wireless communication between the main body 100 and a wireless communication system, between the main body 100 and another main body 100, or between the main body 100 and a network where the other main body 100 (or the external server) is located, over a wireless area network. The wireless area network may be a wireless personal area network.

The short range communication module 114 may sense (or recognize) a mobile device, which is capable of communicating with the main body, near the main body 100. Furthermore, if the sensed mobile device is a device which has obtained authentication for communication with the main body 100 according to the present invention, the control unit 180 may transmit at least some of data processed by the main body 100 to the mobile device through the short range communication module 114. Therefore, a user of the mobile device may use the data processed by the main body 100 through the mobile device. For example, when a call is received by the main body 100, the user may perform a voice call through the mobile device, or when a message is received by the main body 100, the user may check the received message through the mobile device.

The position information module 115 may be a module for obtaining a position (a current position) of the main body, and as a representative example, there may be a global positioning system (GPS) module or a Wi-Fi module. For example, if the GPS module is used, the position of the main body may be obtained from a signal transmitted from a GPS satellite. As another example, if the Wi-Fi module is used, a position of the main body may be obtained based on information about a wireless access point (AP) which transmits or receives a wireless signal to or from the Wi-Fi module. Depending on the case, the position information module 115 may perform a function of another module of the wireless communication unit 110, for obtaining data of the position of the main body through substitution or addition. The position information module 115 may be a module used to obtain the position (the current position) of the main body and is not limited to a module which directly calculates or obtains the position of the main body.

The input unit 120 is for inputting image information (or signal), audio information (or signal), data, or information input from the user, and in order to input the video information, the main body 100 may include one camera 121 or a plurality of cameras 121. The camera 121 may process an image frame such as a still image or a moving image obtained through an image sensor in a video call mode or a photographing mode. The processed image frame may be displayed by the display unit 151 or may be stored in the memory 170. The plurality of cameras 121 included in the main body 100 may be arranged in a matrix structure, and by using the cameras 121 arranged in the matrix structure, pieces of image information having various angles or focal points. Also, the plurality of cameras 121 may be arranged in a stereo structure so as to obtain a left image and a right image for realizing a stereoscopic image.

The microphone 122 may process an external sound signal into electrical voice data. The processed voice data may be variously used based on a function (or an application program which is being executed) which is being performed by the main body 100. The microphone 122 may execute various noise removal algorithms for removing noise which occurs in a process of receiving an external sound signal.

The user input unit 123 is for receiving information from the user, and when information is input through the user input unit 123, the control unit 180 may control an operation of the main body 100, based on the input information. The user input unit 123 may include a mechanical input means (or a mechanical key, for example, a button, a dome switch, a jog wheel, and a jog switch disposed on a front surface, a rear surface, or a side surface of the main body 100) and a touch type input means. For example, the touch type input means may be configured with a virtual key, a soft key, or a visual key displayed on the touch screen through software processing, or may be configured with a touch key disposed in a portion other than the touch screen. The virtual key or the visual key may have various shapes and may be displayed on the touch screen, and for example, may be configured with graphic, a text, an icon, a video, or a combination thereof.

A device module coupling unit 130 may be disposed on an upper surface of the main body 100 and may be coupled to various device modules such as a camera module, a projector module, etc.

The device module coupling unit 130 may include a wireless charging terminal (not shown), and a device module contacting the device module coupling unit 130 may be wireless charged with power supplied from the main body 100.

Moreover, the device module coupling unit 130 and the device modules may be manufactured with a material having magnetism, and the main body 100 may adjust magnetism to raise the device module to a certain height from the device module coupling unit 130.

An embodiment where the magnetism of the device module coupling unit 130 is used will be described in more detail with reference to the following drawings.

The sensing unit 140 may sense at least one of information about the main body, ambient environment information about a periphery of the main body, and user information and may generate a sensing signal corresponding to the sensed information. The control unit 180 may control driving or an operation of the main body 100, or may perform data processing, a function, or an operation associated with an application program installed in the main body 100, based on the sensing signal. Representative sensors of various sensors capable of being included in the sensing unit 140 will be described below in more detail.

First, the proximity sensor 141 may denote a sensor which detects an object approaching a certain detection surface or an object located near the sensor by using an electromagnetic force or infrared light without a mechanical contact. The proximity sensor 141 may be disposed in an inner region of the main body surrounded by the touch screen, or may be disposed near the touch screen.

Examples of the proximity sensor 141 may include a transmissive photoelectric sensor, a direct reflective photoelectric sensor, a mirror reflective photoelectric sensor, a high frequency oscillating proximity sensor, a capacitive proximity sensor, a magnetic proximity sensor, an infrared proximity sensor, etc. If the touch screen is a capacitive type, the proximity sensor 141 may be configured to detect the proximity of the object, based on a variation of an electric field caused by the proximity of the object having conductivity. In this case, the touch screen (or a touch sensor) may be classified into a proximity sensor.

For convenience of description, an action where an object approaches the touch screen without contacting the touch screen and is recognized as being located on the touch screen may referred to as a proximity touch, and an action where an object actually contacts the touch screen may be referred to as a contact touch. A position at which a proximity touch of an object is performed on the touch screen may denote a position at which the object vertically corresponds to the touch screen when the proximity touch of the object is performed. The proximity sensor 141 may sense a proximity touch and a proximity touch pattern (for example, a proximity touch distance, a proximity touch direction, a proximity touch speed, a proximity touch time, a proximity touch position, a proximity touch moving state, etc.). The control unit 180 may process data corresponding to a proximity touch action and a proximity touch pattern sensed through the proximity sensor 141, and may display visual information, corresponding to the processed data, on the touch screen. Also, the control unit 180 may control the main body 100 so as to process different actions or data (or information), based on whether a touch performed on the same point of the touch screen is a proximity touch or a contact touch.

The touch sensor may sense a touch (or a touch input) applied to the touch screen (or the display unit 151) by using at least one of various touch types such as a resistive type, a capacitive type, an infrared type, an ultrasonic type, and a magnetic type.

For example, the touch sensor may be configured to convert a variation of pressure applied to a specific part of the touch screen, or convert a variation of a capacitance occurring at a specific part, into an electric input signal. Also, the touch sensor may be configured to sense a touched position, a touched area, touch pressure, and a touch capacitance when a touch object applies a touch to the touch screen. Here, the touch object may be an object which applies the touch to the touch screen, and for example, may be a finger, a touch pen, a stylus pen, a pointer, or the like.

When a touch input is sensed by the touch sensor, a signal(s) corresponding to the touch input may be transmitted to a touch controller. The touch controller may process the signal(s), and then, may transmit corresponding data to the control unit 180. Accordingly, the control unit 180 may determine which region of the display unit 151 has been touched. Here, the touch controller may be a component separate from the control unit 180, or may be the control unit 180 itself.

The control unit 180 may execute the same or different controls according to a type of a touch object that touches the touch screen (or a touch key provided in addition to the touch screen). Whether to execute the same or different controls according to the type of the object may be determined based on a current operating state of the main body 100 or a currently executed application program.

The touch sensor and the proximity sensor may be implemented individually, or in combination, to sense various types of touches such as a short (or tap) touch, a long touch, a multi-touch, a drag touch, a flick touch, a pinch-in touch, a pinch-out touch, a swipe touch, a hovering touch, and the like.

The ultrasonic sensor may recognize position information about a sensing target by using ultrasonic waves. The control unit 180, for example, may calculate a position of a wave generation source based on information sensed by a photo sensor and a plurality of ultrasonic sensors. The position of the wave generation source may be calculated based on a feature where light is much faster than ultrasonic waves, namely, a feature where a time taken until the light reaches the photo sensor is much shorter than a time taken until the ultrasonic wave reaches the ultrasonic sensor. In more detail, the position of the wave generation source may be calculated based on a time difference between a time taken until the ultrasonic wave reaches the ultrasonic sensor and a time taken until the light, a reference signal, reaches the photo sensor.

The camera 121 described as the element of the input unit 120 may include at least one of a camera sensor (for example, CCD, CMOS etc.), a photo sensor (or an image sensor), and a laser sensor.

The camera 121 and a laser sensor may be combined with each other to sense a touch of a sensing target with respect to a three-dimensional (3D) stereoscopic image. The photo sensor may be stacked on a display device and may be configured to scan a movement of the sensing target approaching the touch screen. In more detail, the photo sensor may include photo diodes and transistors at rows and columns to scan content received at the photo sensor using an electrical signal which changes according to the quantity of applied light. That is, the photo sensor may calculate coordinates of the sensing target according to a variation of light, thereby obtaining position information about the sensing target.

The display unit 151 may display (output) information processed in the main body 100. For example, the display unit 151 may display execution screen information about an application program driven by the main body 100 or user interface (UI) and graphic user interface (GUI) information based on the execution screen information.

Moreover, the display unit 151 may be configured as a stereoscopic display unit for displaying stereoscopic images.

The stereoscopic display unit may use a 3D display type such as a stereoscopic type (a glasses type), an auto-stereoscopic type (a glasses-free type), a projection type (a holographic type), or the like.

The sound output unit 152 may output audio data received from the wireless communication unit 110 or stored in the memory 170 in a call signal reception mode, a call mode, a record mode, a voice recognition mode, a broadcast reception mode, or the like. The sound output unit 152 may provide a sound signal relevant to a function (for example, a call signal reception sound, a message reception sound, etc.) performed by the main body 100. The sound output unit 152 may include a receiver, a speaker, a buzzer, and/or the like.

The haptic module 153 may be configured to generate various tactile effects that a user feels. A typical example of a tactile effect generated by the haptic module 153 may be vibration. The strength, pattern and the like of the vibration generated by the haptic module 153 may be controlled by a user selection or a setting by the control unit. For example, the haptic module 153 may synthesize and output different vibrations, or may sequentially output the different vibrations.

In addition to vibration, the haptic module 153 may generate various tactile effects including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element capable of absorbing or generating heat, and the like.

The haptic module 153 may be implemented to allow the user to feel a tactile effect through a muscle sensation such as the user's fingers or arm, in addition to transferring the tactile effect through direct contact. The haptic module 153 may be provided as two or more depending on a configuration aspect of the main body 100.

The light output unit 154 may output a signal for notifying occurrence of an event, based on light of a light source for the main body 100. Examples of the event occurring in the main body 100 may include message reception, call signal reception, a missed call, an alarm, a schedule notice, email reception, information reception through an application, and the like.

A signal output by the light output unit 154 may be generated based on light of a single color or lights of a plurality of colors emitted from a front surface or a rear surface of the main body 100. The signal output may end when the main body 100 senses that a user has checked the event.

The interface unit 160 may act as a path for all external devices connected to the main body 100. The interface unit 160 may receive data transmitted from an external device, receive power to transfer the power to the internal elements of the main body 100, or transmit internal data of the main body 100 to an external device. The interface unit 160 may include, for example, wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various pieces of information for authenticating an authority to use the main body 100 and may include a user identity module (UIM), a subscriber identity module (SIM), a universal subscriber identity module (USIM), and the like. In addition, a device (hereinafter referred to as an identification device) including the identification module may be manufactured as a smart card type. Accordingly, the identification device may be connected to the main body 100 via the interface unit 160.

Moreover, when the main body 100 is connected to an external cradle, the interface unit 160 may serve as a path through which power from the cradle is supplied to the main body 100, or may serve as a path through which various command signals input by the user from the cradle are transferred to the main body 100. The various command signals or the power input from the cradle may function as a signal for recognizing that the main body 100 is properly mounted on the cradle.

The memory 170 may store programs for supporting operations of the control unit 180 and store input/output data (for example, phonebook, messages, still images, moving images, etc.). The memory 170 may store data related to various patterns of vibrations and sounds which are output when a touch input is applied to the touch screen.

The memory 170 may include one or more types of storage mediums including a flash memory type, a hard disk type, a solid state disk (SSD) type, a silicon disk drive (SDD) type, a multimedia card micro type, a card-type memory (e.g., SD, DX memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disk, and the like. The main body 100 may operate in association with a web storage that performs a storage function of the memory 170 over the Internet.

As described above, the control unit 180 may generally control an operation relevant to an application program and an overall operation of the main body 100. For example, when a status of the main body meets a preset condition, the control unit 180 may set or release a lock state for restricting an input of a control command which is input from the user for controlling execution of applications.

Moreover, the control unit 180 may perform control and processing associated with voice calls, data communications, video calls, and the like, or may perform pattern recognition processing to recognize a handwriting input or a picture drawing input performed on the touch screen as characters or images, respectively. In addition, the control unit 180 may control one or a combination of the above-described elements in order to implement various exemplary embodiments in the main body 100.

The power supply 190 may receive external power or internal power to supply power necessary for an operation of each of the elements, based on control by the control unit 180. The power supply 190 may include a battery, which is typically rechargeable or be detachably coupled to the main body for charging.

Moreover, the power supply 190 may include a connection port. The connection port may be configured as one example of the interface unit 160 to which an external charger for supplying power to recharge the battery is electrically connected.

As another example, the power supply 190 may be configured to recharge the battery in a wireless manner without using the connection port. In this example, the power supply 190 may receive power, transferred from an external wireless power transmitter, using at least one of an inductive coupling method which is based on magnetic induction or a magnetic resonance coupling method which is based on electromagnetic resonance.

Hereinafter, various embodiments described herein may be implemented in a recording medium readable by computers or devices similar thereto by using, for example, software, hardware, or any combination thereof.

Next, a communication system implementable through the main body 100 according to the present invention will be described.

First, the communication system may use different wireless interfaces and/or physical layers. For example, a wireless interface available to the communication system may use frequency division multiple access, (FDMA), time division multiple access (TDMA), code division multiple access (CDMA), universal mobile telecommunications system, (UMTS) (particularly, long term evolution (LTE), long term evolution-advanced (LTE-A)), global system for mobile communications, (GSM), and the like.

Hereinafter, for convenience of description, CDMA will be described. However, the present invention may be applied to all communication systems including an orthogonal frequency division multiplexing (OFDM) wireless communication system as well as a CDMA wireless communication system.

The CDMA wireless communication system may include at least one terminal 100, at least one base station (BS) (which may be referred to as a node B or an evolved node B), at least one base station controllers (BSCs), and a mobile switching center (MSC). The MSC may be connected to a public switched telephone network (PSTN) and the BSCs. The BSCs may be paired with and connected to the BS through a backhaul line. The backhaul line may be configured based on at least one of E1/T1, ATM, IP, PPP, Frame Relay, HDSL, ADSL, and xDSL. Therefore, a plurality of BSCs may be included in the CDMA wireless communication system.

A plurality of BSs may each include at least one sector, and a plurality of sectors may each include an antenna indicating a specific direction radially from an omni-directional antenna or a BS. Also, each of the sectors may include two or more various types of antennas. Each of the BSs may be configured to support a plurality of frequency allocations, and the plurality of frequency allocations may each have a specific spectrum (for example, 1.25 MHz, 5 MHz, etc.).

Intersection of sector and frequency allocations may be referred to as a CDMA channel. The BS may be referred to as a base station transceiver subsystem (BTSs). In this case, a generic name for one BSC and at least one BS may be a base station. Also, the base station may represent a cell site. Alternatively, each of a plurality of sectors for a specific BS may be referred to as a plurality of cell sites.

In addition, the CDMA wireless communication system may be associated with a GPS for checking a position of the main body 100. A GPS satellite may help check the position of the main body 100. Useful position information may be obtained from two or less or more satellites. Here, the position of the main body 100 may be traced by using all technologies capable of tracing positions, in addition to GPS tracing technology. Also, at least one of GPS satellites may selectively or additionally perform DMB transmission.

The position information module 115 included in the main body is for detecting, calculating, or identifying a position of the main body, and representative examples of the position information module 115 may include a GPS module and a Wi-Fi module. Depending on the case, the position information module 115 may perform a function of another module of the wireless communication unit 110, for obtaining data of the position of the main body through substitution or addition.

The GPS module 115 may calculate accurate time information and distance information far away from three or more satellites and may apply trigonometry to the calculated information to accurately calculate current 3D position information based on latitude, longitude, and altitude. At present, a method of calculating position and time information by using three satellites and correcting the calculated position and time information by using another one satellite is being widely used. Also, the GPS module 115 may calculate speed information by continuously calculating a current position in real time. However, in a shadow zone of a satellite signal like an indoor place, it is difficult to accurately measure the position of the main body by using the GPS module. Therefore, a Wi-Fi positioning system (WPS) may be used for compensating for positioning of a GPS manner.

The WPS may be technology for tracing the position of the main body 100 by using the Wi-Fi module included in the main body 100 and a wireless AP which transmits or receives a wireless signal to or from the Wi-Fi module, and may denote positioning technology based on a wireless local area network (WLAN) using Wi-Fi.

The WPS may include a Wi-Fi positioning server, the main body 100, a wireless AP connected to the main body 100, and a database that stores arbitrary wireless AP information.

The main body 100 connected to the wireless AP may transmit a position information request message to the Wi-Fi positioning server.

The WPS may extract information about the wireless AP connected to the main body 100, based on the position information request message (or signal) from the main body 100. The information about the wireless AP connected to the main body 100 may be transmitted to the Wi-Fi positioning server through the main body 100, or may be transmitted from the wireless AP to the Wi-Fi positioning server.

The information about the wireless AP extracted based on the position information request message from the main body 100 may be at least one of an MAC address, a service set identification (SSID), a received signal strength indicator (RSSI), a reference signal received power (RSRP), reference signal received quality (RSRQ), channel information, privacy, a network type, signal strength, and noise strength.

As described above, the WPS may receive the information about the wireless AP connected to the main body 100 and may extract wireless AP information, corresponding to the wireless AP connected to the main body 100, from a previously built database. In this case, information about arbitrary wireless APs stored in the database may include information such as an MAC address, an SSID, channel information, privacy, a network type, latitude and longitude coordinates of a wireless AP, a name of a building at which the wireless AP is located, the number of floors, indoor detailed position information (GPS coordinates being available), an address of an AP possessor, a phone number, etc. In this case, in order to remove a mobile AP or a wireless AP provided by using an unlawful MAC address in a positioning process, the WPS may extract only a certain number of wireless AP information in descending power of RSSI.

Subsequently, the Wi-Fi positioning server may extract (or analyze) position information about the main body 100 by using at least one piece of wireless AP information extracted from the database. The Wi-Fi positioning server may compare included information with the received wireless AP information to extract (or analyze) the position information about the main body 100.

A method of extracting (or analyzing) the position information about the main body 100 may use a cell-ID method, a finger print method, a triangulation method, and a landmark method.

The cell-ID method may be a method which determines a position of a wireless AP having strongest signal strength as a position of the main body, based on pieces of ambient wireless AP information collected by the main body. Implementation is simple, the separate cost is not expended, and position information is quickly obtained. However, if an installation density of a wireless AP is low, a precision of positioning is reduced.

The finger print method may be a method which selects a reference position in a service zone to collect signal strength information, and estimates a position by using signal strength information transmitted from the main body, based on the collected information. In order to use the finger print method, it is required to previously store a radio wave characteristic in a database.

The triangulation method may be a method which calculates a position of the main body, based on a distance between coordinates of at least three wireless APs and the main body. In order to measure a distance between the main body and a wireless AP, signal strength may be converted into distance information, or a time (time of arrival (ToA)) when a wireless signal is transferred, a time difference (time difference of arrival (TDoA)) in transferring a signal, and an angle (angle of arrival (AoA)) at which a signal is transferred may be used.

The landmark method may be a method which measures a position of the main body by using a landmark transmitter of which a position is previously known.

In addition to the above-described methods, various algorithms may be used as a method for extracting (or analyzing) position information about the main body.

The extracted position information about the main body 100 may be transmitted to the main body 100 through the Wi-Fi positioning server, and thus, the main body 100 may obtain the position information.

The main body 100 may access at least one wireless AP and may obtain the position information. In this case, the number of wireless APs necessary for obtaining the position information about the main body 100 may be variously changed based on a wireless communication environment where the main body 100 is located.

Figure 2:
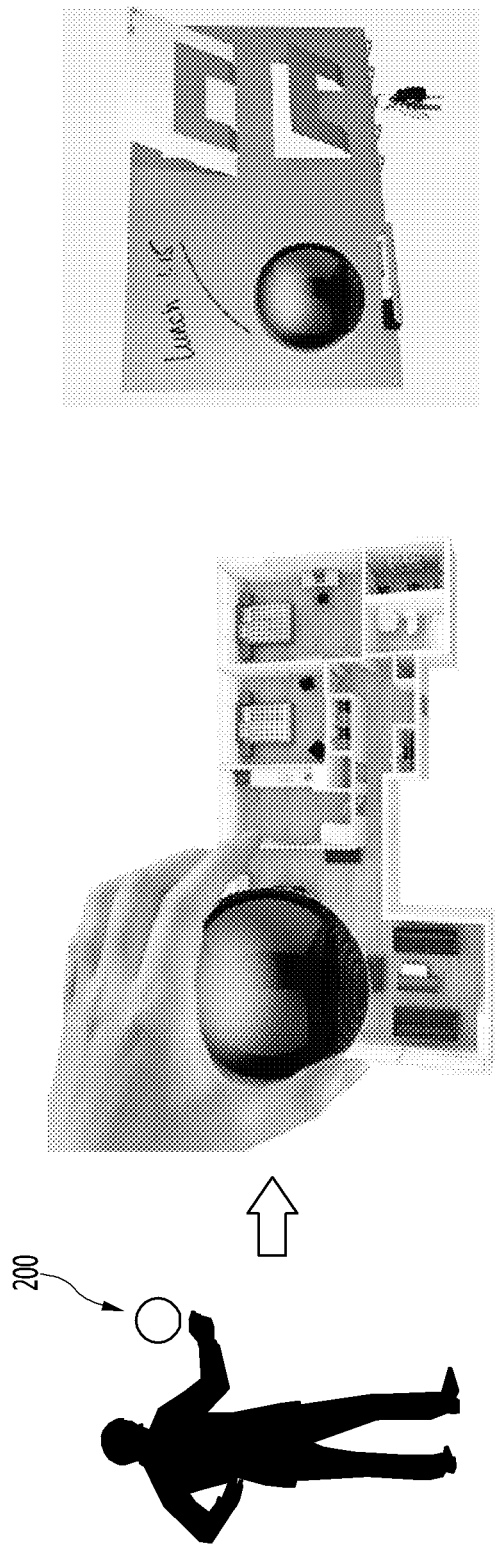
FIG. 2 is a diagram for describing a movement of a device module of a module type home robot according to the present invention.

FIG. 2 is a diagram for describing a movement of a device module 200 of a module type home robot according to the present invention.

As illustrated in FIG. 2, the device module 200 of the module type home robot according to the present invention may be separated from the main body 100, and the device module 200 may perform wireless communication with the main body 100.

That is, the user may separate only the device module 200 from the module type home robot and may locate the device module 200 at a desired place in home.

Moreover, an outer portion of the device module 200 may be manufactured with a magnet material such as neodymium, samarium cobalt, ferrite, or the like.

Therefore, the user may locate the device module 200 at all places capable of generating a magnetic force to drive a desired function.

Figure 3:
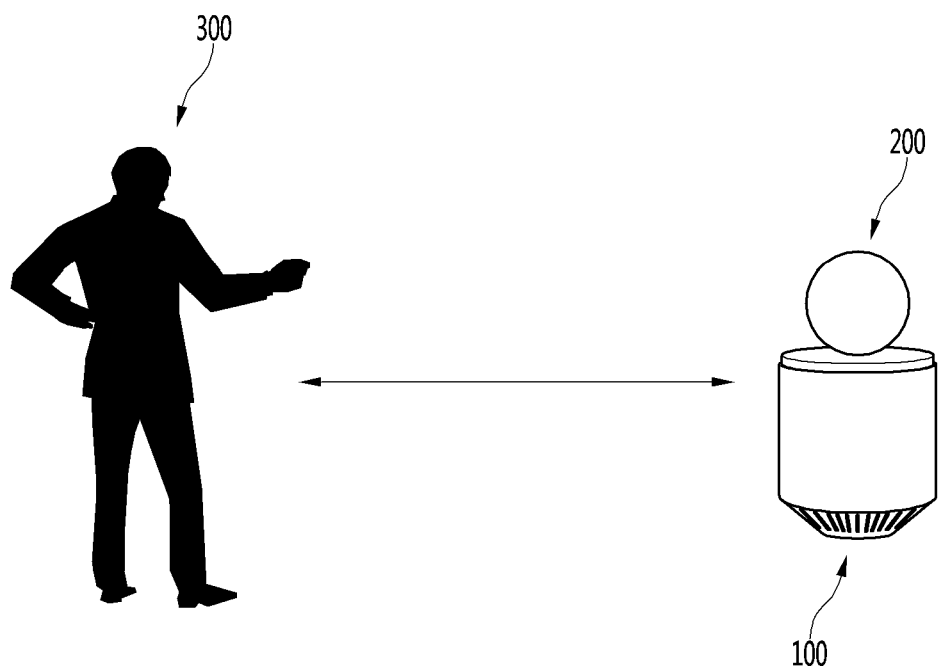
Figure 4:
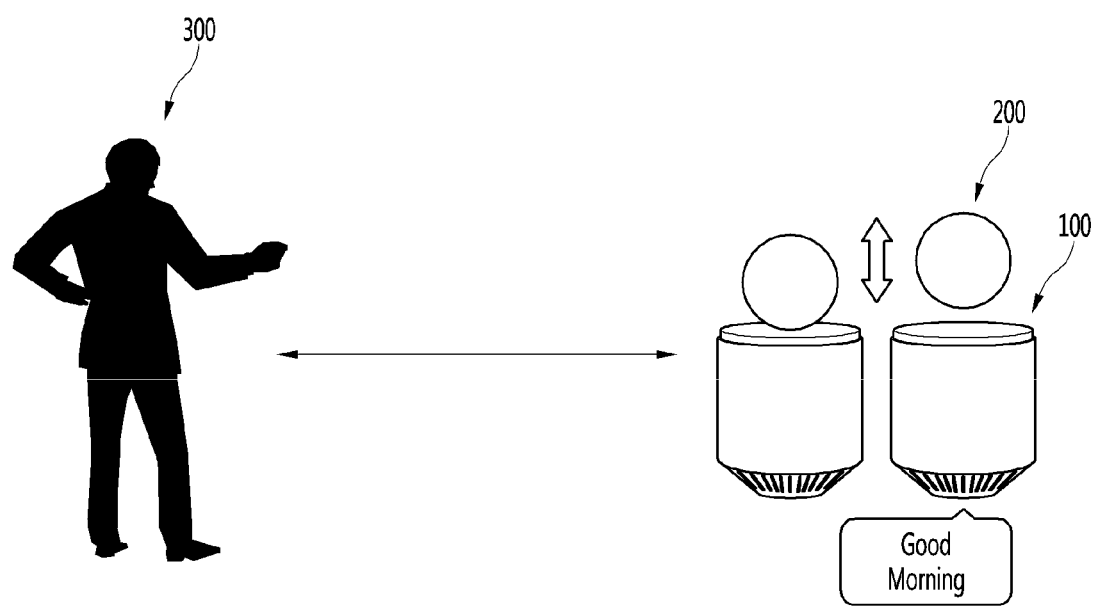

FIGS. 3 to 5 are diagrams for describing an example where a module type home robot according to the present invention recognizes a user to react.

As illustrated in FIG. 3, the module type home robot according to the present invention may sense a user 300 at a predetermined distance by using a proximity sensor.

As illustrated in FIG. 3, when the user 300 is spaced apart from the home robot by a certain distance or more, the module type home robot may be deactivated. That is, when the user 300 is spaced apart from the home robot by the certain distance or more, the module type home robot may be deactivated, thereby minimizing power consumption.

On the other hand, as illustrated in FIG. 4, when the user 300 is sensed at a certain distance, the main body 100 and the device module 200 may be activated. In this case, the trigger signal may include a user proximity signal.

Moreover, the main body 100 may raise the device module 200 to a certain height by using a magnetic force. The control unit 180 may raise the device module 200 by a certain distance or more from the device module coupling unit 130 based on the user proximity signal.

Moreover, while the device module 200 is located at the certain height, the main body 100 may output, through a speaker, a message greeting to the user.

Moreover, as illustrated in FIG. 5, in a state where the device module 200 is located at the certain height, when the user 300 gets closer to the home robot than a distance of FIG. 4, the main body 100 may change magnetism to allow an LED unit 205 of the device module 200 to face the user 300.

Therefore, by performing control as in FIGS. 3 to 5, the user may perform an interaction with the module type home robot even without an additional activation operation.

Figure 6:
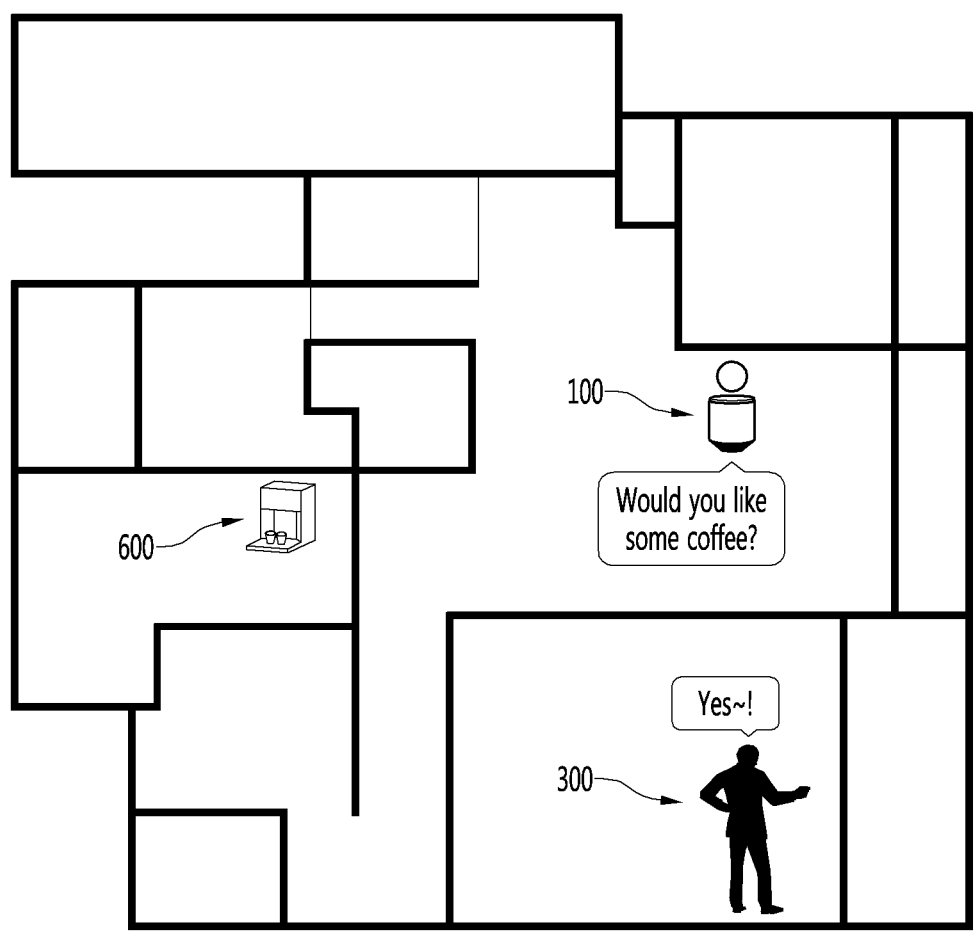
FIGS. 6 and 7 are diagrams for describing an example where a module type home robot according to the present invention controls an external device according to a user input.
Figure 7:
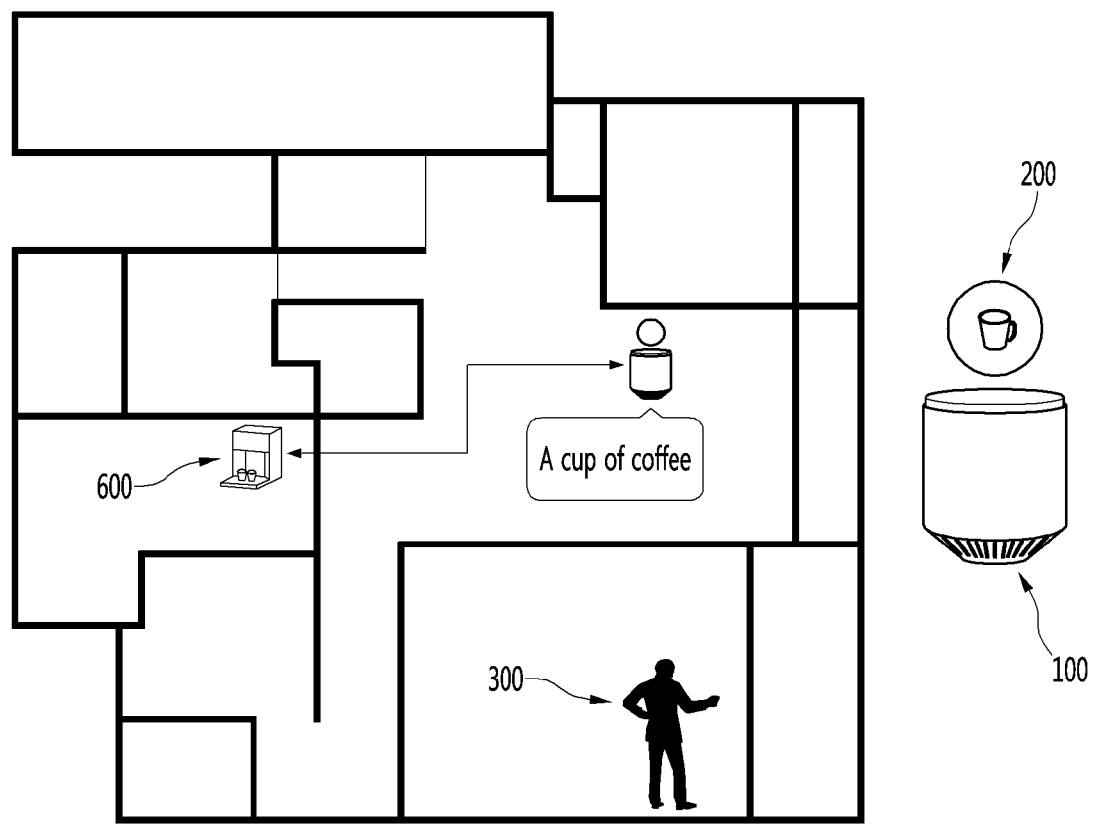

FIGS. 6 and 7 are diagrams for describing an example where a module type home robot according to the present invention controls an external device according to a user input.

As illustrated in FIG. 6, when a predetermined time arrives, a voice recognition function of the main body 100 of the module type home robot according to the present invention may be automatically activated. In this case, the trigger signal may be the specific time sensing signal.

In this case, the main body 100 may output, through a speaker, a pre-input voice message without a user input.

For example, the main body 100 may always output, through the speaker, a voice message associated with an order of coffee at 7 a.m. That is, the control unit 180 may output, through the sound output unit 152, a predetermined voice message mapped to a specific time.

At this time, the user 300 may input, through a microphone of the main body 100, a response message to an order of coffee.

In FIG. 6, it may be assumed that the user 300 inputs a message ordering coffee through voice recognition. In this case, the trigger signal may be the user voice signal.

The main body 100 which has received a voice recognition message for ordering coffee from the user 300 may transmit a message, issuing a command to extract a cup of coffee, to a coffee machine 600 wirelessly connected thereto.

Furthermore, the main body 100 may perform control to display a coffee cup image on the device module 200.

On the other hand, when the voice recognition message or a voice command is not received within a predetermined time after the voice message is output, the control unit 180 of the main body 100 may process the voice message into a message for mobile device, and transmit the processed message to the mobile device of the user.

In FIGS. 6 to 7, the coffee machine is described as an example of an external device, but a common application may be applied to all devices located in home, in addition to the coffee machine.

Figure 8:
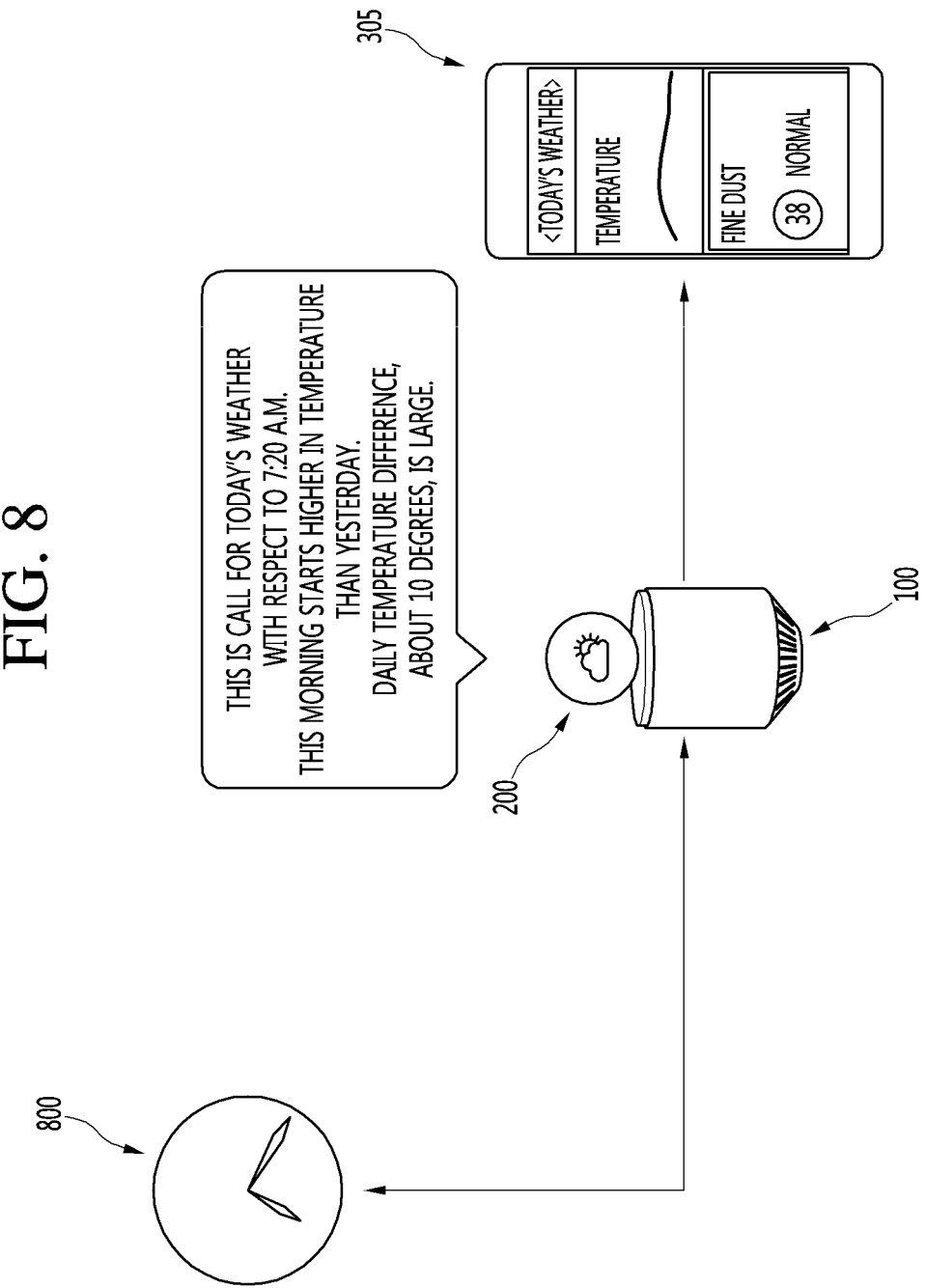
FIG. 8 is a diagram for describing an example where a module type home robot according to the present invention performs an hourly repetitive operation.

FIG. 8 is a diagram for describing an example where a module type home robot according to the present invention performs an hourly repetitive operation.

The module type home robot according to the present invention may perform a repetitive operation at every certain time or certain period, based on a user setting.

For example, as illustrated in FIG. 8, the main body 100 may receive weather information from an external server at 7:20 (certain time, 800) every morning.

The main body 100 which has received the weather information may output corresponding weather information as a voice through a speaker.

Moreover, in a case of outputting the weather information as a voice, the main body 100 may perform control to display a weather image on the device module 200.

Moreover, when the main body 100 receives the weather information, the main body 100 may transmit the weather information to a predetermined mobile device 305 of the user.

The mobile device 305 of the user which has received the weather information from the main body 100 may display the weather information on a screen.

In FIG. 8, an output of weather information is described as an example of a certain repetitive operation, but various operations may be included in the scope of the present invention.

Figure 9:
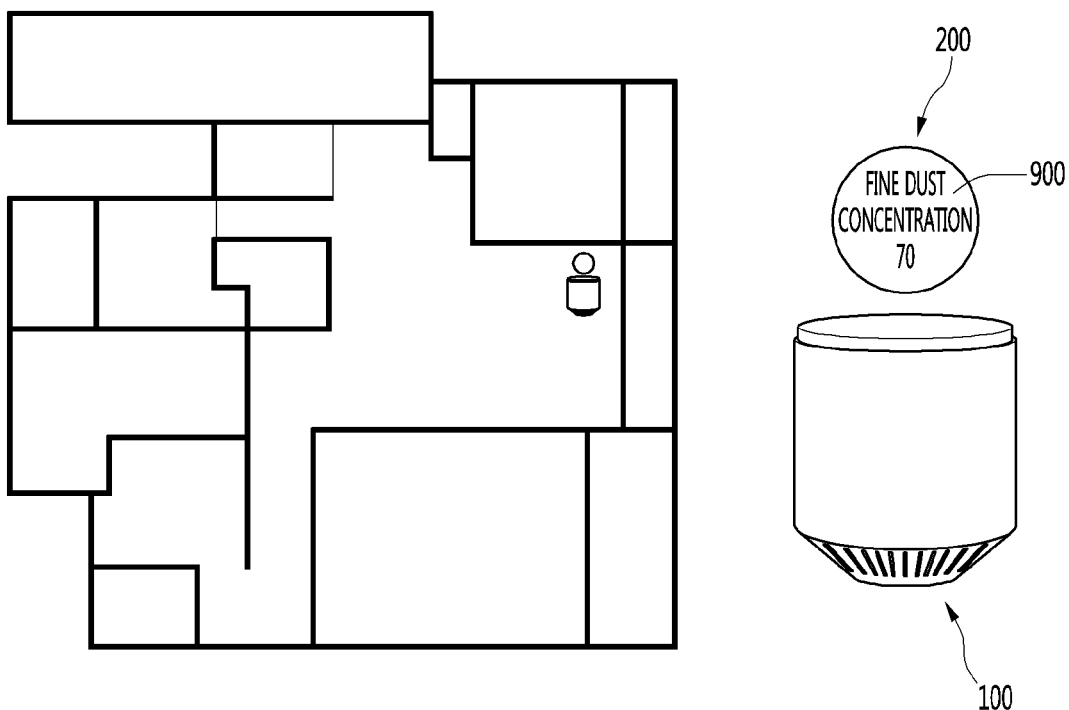
FIGS. 9 to 11 are diagrams for describing an example where a module type home robot according to the present invention performs an interaction with a user by using a dust sensor.
Figure 10:
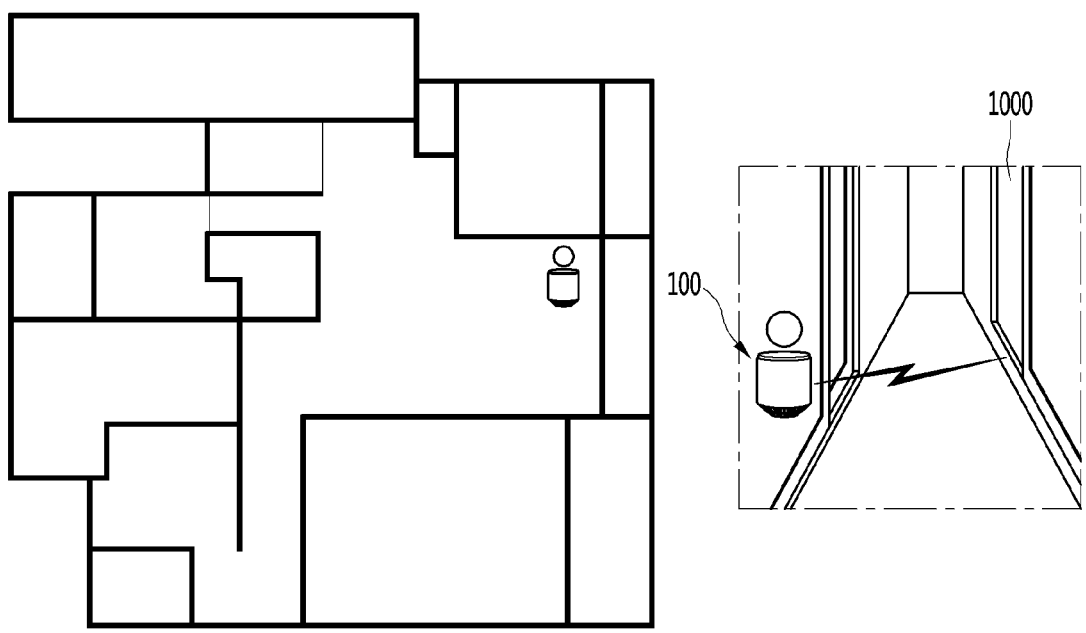
Figure 11:
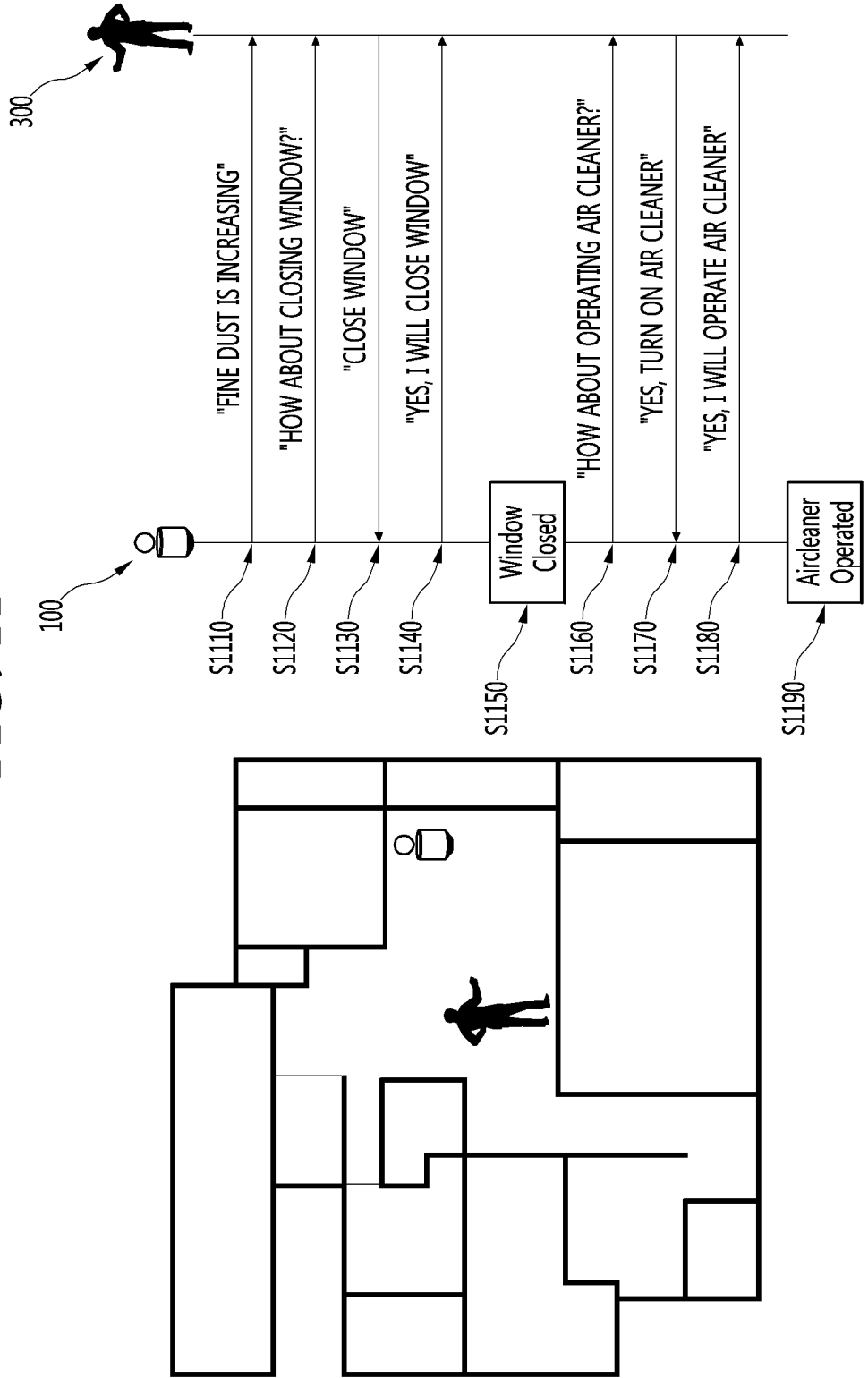

FIGS. 9 to 11 are diagrams for describing an example where a module type home robot according to the present invention performs an interaction with a user by using a dust sensor.

As illustrated in FIGS. 9 to 11, the main body 100 of the module type home robot according to the present invention may sense a concentration of dusts by using a dust sensor, and then, may perform an interaction for removing the dusts with the user 300. In this case, the trigger signal may be the environmental change sensing signal.

First, the main body 100 of the module type home robot located in home may include a gas sensor or the dust sensor. In FIGS. 9 to 11, the device module 200 may be assumed as a dust sensing module including the dust sensor.

The device module 200 may detect the concentration of the dusts in real time and may display the detected concentration of the dusts.

Moreover, the main body 100 may receive dust concentration information from the device module 200 in real time.

As illustrated in FIG. 10, when it is determined that the concentration of the dusts rapidly increases for a predetermined time, based on the received dust concentration information, the main body 100 may communicate with a window opening/closing device 1000 to allow the window opening/closing device 1000 to close windows.

Moreover, as illustrated in FIG. 11, the main body 100 may perform an interaction for removing the dusts with the user 300.

As illustrated in FIG. 11, when the concentration of the dusts is equal to or more than a certain concentration, the main body 100 may first transmit a message, indicating an increase in concentration of the dusts, to a user 300 located at a predetermined distance in operation S1110, and may transmit a message for issuing a request to close the windows in operation S1120.

The user 300 may input a message for issuing a command to close the windows by using a voice recognition function in operation S1130.

The main body 100 which has received the user message may output a voice corresponding to message reception acknowledgement in operation S1140, and may control the window opening/closing device to close the windows in operation S1150.

Furthermore, the main body 100 may transmit an air cleaner driving request message to the user 300 so as to decrease a concentration of current dusts in home in operation S1160.

The user 300 may input a message for issuing a command to drive the air cleaner by using the voice recognition function in operation S1170.

The main body which has received the user message may output a voice corresponding to message reception acknowledgement in operation S1180, and may perform control to drive the air cleaner in operation S1190.

Figure 12:
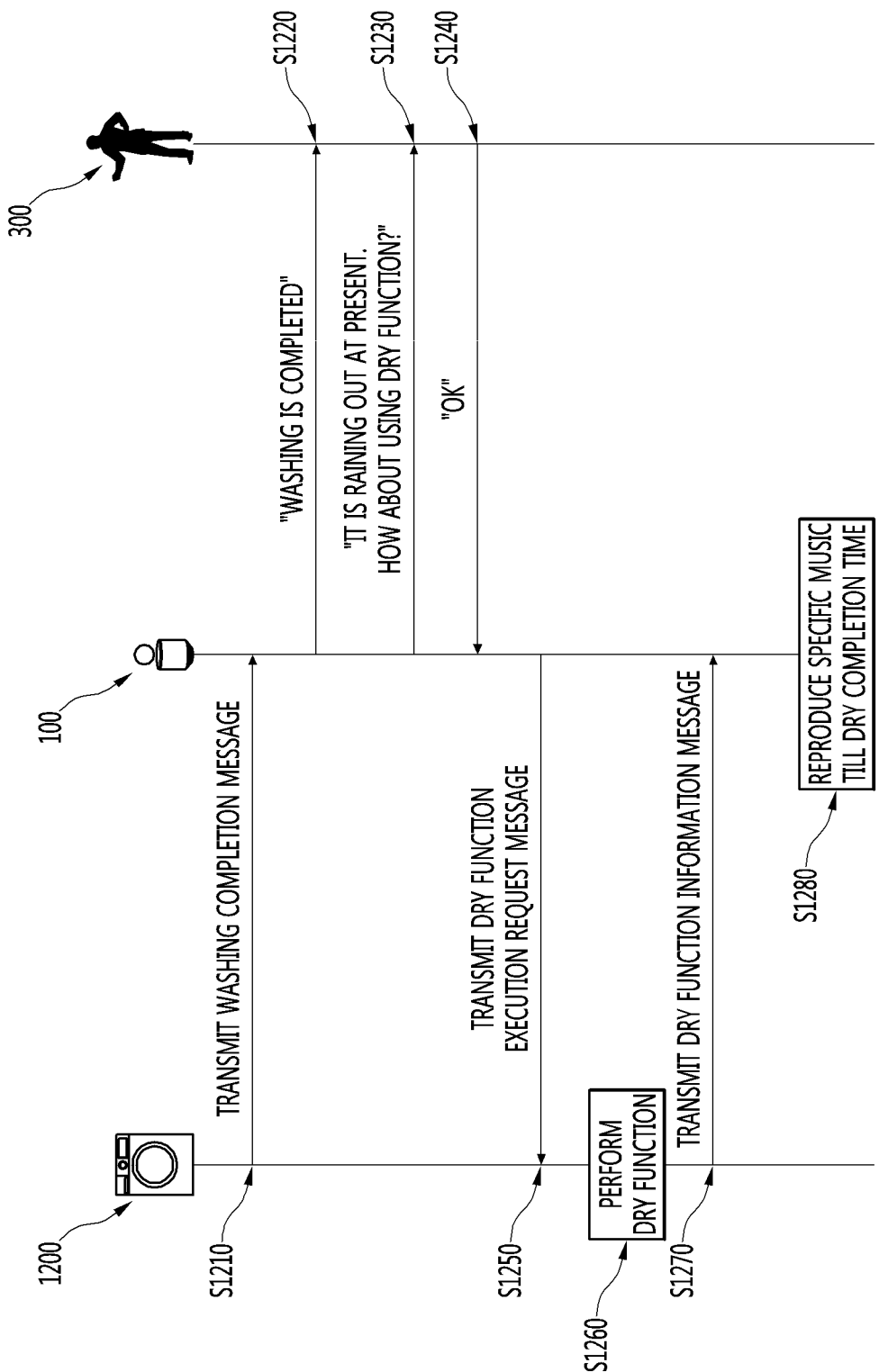
FIG. 12 is a diagram for describing an example where a module type home robot according to the present invention simultaneously performs an interaction with an external device and a user.

FIG. 12 is a diagram for describing an example where a module type home robot according to the present invention simultaneously performs an interaction with an external device and a user.

As illustrated in FIG. 12, the main body 100 of the module type home robot according to the present invention may simultaneously perform an interaction with an external device 1200 and a user 300. In FIG. 12, for convenience of description, the external device 1200 may be assumed as a washing machine.

First, when washing is completed, the washing machine 1200 may transmit a completion message to the main body 100 in operation S1210.

Moreover, the main body 100 may output, through a speaker, a voice message indicating that the washing is completed in operation S1220.

Moreover, the main body 100 may output a message requesting the use of a dry function of the washing machine in the form of voice messages, based on current weather information in operation S1230.

The main body 100 may receive a dry function request message as voice data from the user in operation S1240.

The main body 100 may transmit a dry function execution request message to the washing machine 1200 in operation S1250.

The washing machine 1200 which has received the message may execute the dry function in operation S12600, and may transmit a message including dry method and dry time information to the main body 100 in operation S1270.

Moreover, the main body 100 may reproduce a specific music through the speaker until dry is completed in operation S1280.

In FIG. 12, based on the above described method, the user may control various devices in home by using the home robot without directly checking the washing machine.

Figure 13:
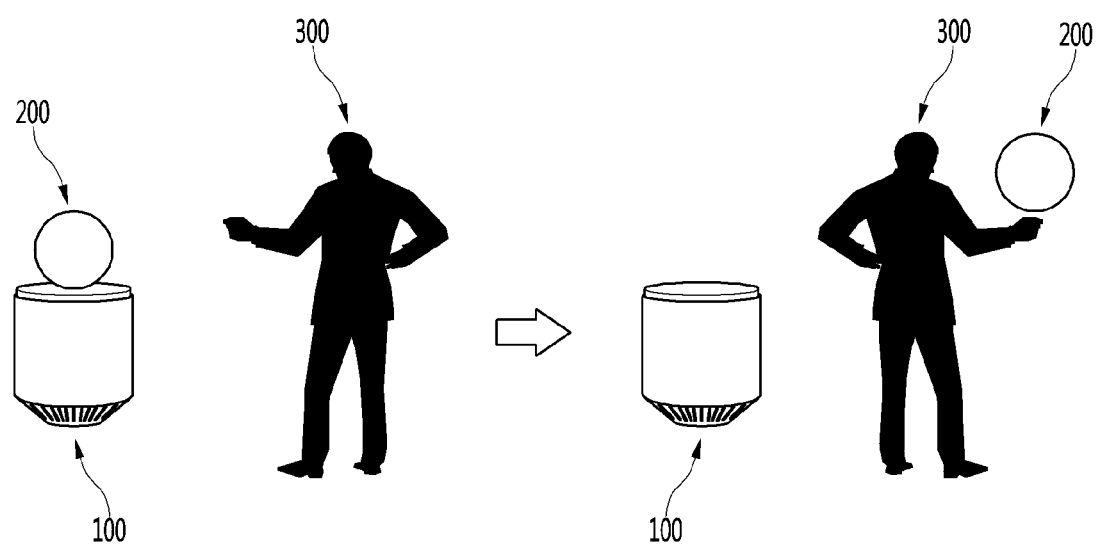
FIGS. 13 and 14 are diagrams for describing an example where only a device module of elements of a module type home robot according to the present invention operates separately.
Figure 14:
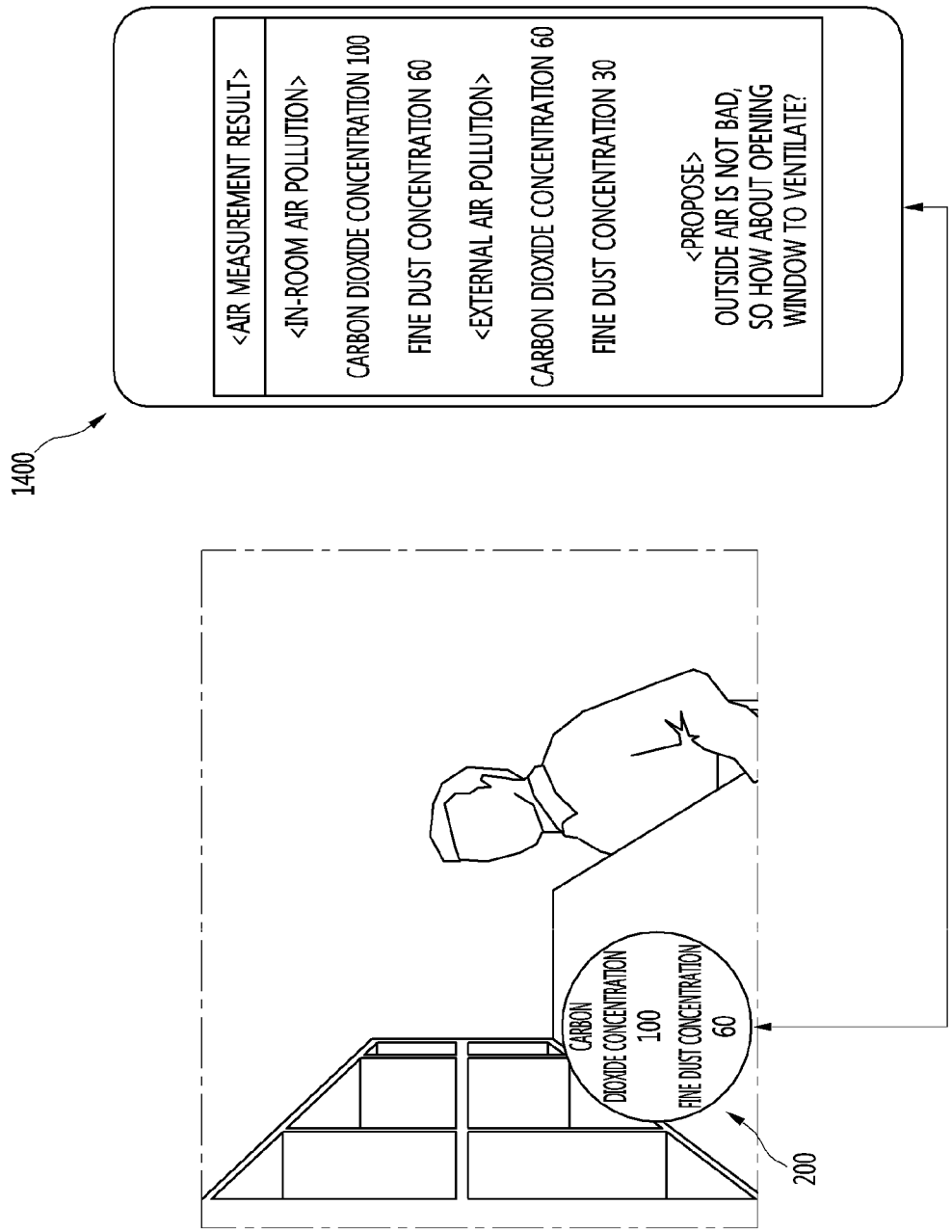

FIGS. 13 and 14 are diagrams for describing an example where only a device module of elements of a module type home robot according to the present invention operates separately.

As described above, in the module type home robot according to the present invention, the main body 100 may be separated from the device module 200.

As illustrated in FIG. 13, a user 300 may separately move only the device module 200 of the elements of the robot. In this case, the main body 100 may be deactivated, and only the device module 200 may be activated. In FIGS. 13 and 14, the device module 200 may be assumed as a dust sensor module.

As illustrated in FIG. 14, the device module 200 may be autonomously activated even without the main body and may execute a dust sensor function.

Moreover, dust concentration information which is sensed in real time may be displayed on one external surface of the device module 200.

Moreover, when a concentration of dusts is higher than a predetermined concentration and a certain time elapses, the device module 200 may transmit a message including current air pollution information to a user mobile device 1400.

The user may perform air cleaning of a corresponding space with reference to the dust concentration information displayed on the mobile device 1400, in addition to the device module 200.

FIGS. 15 to 19 are diagrams for describing an example where a device module of a module type home robot according to the present invention is a camera module.

In FIGS. 15 to 19, available embodiments will be described on the assumption that the device module 200 is a camera module 204.

Figure 15:
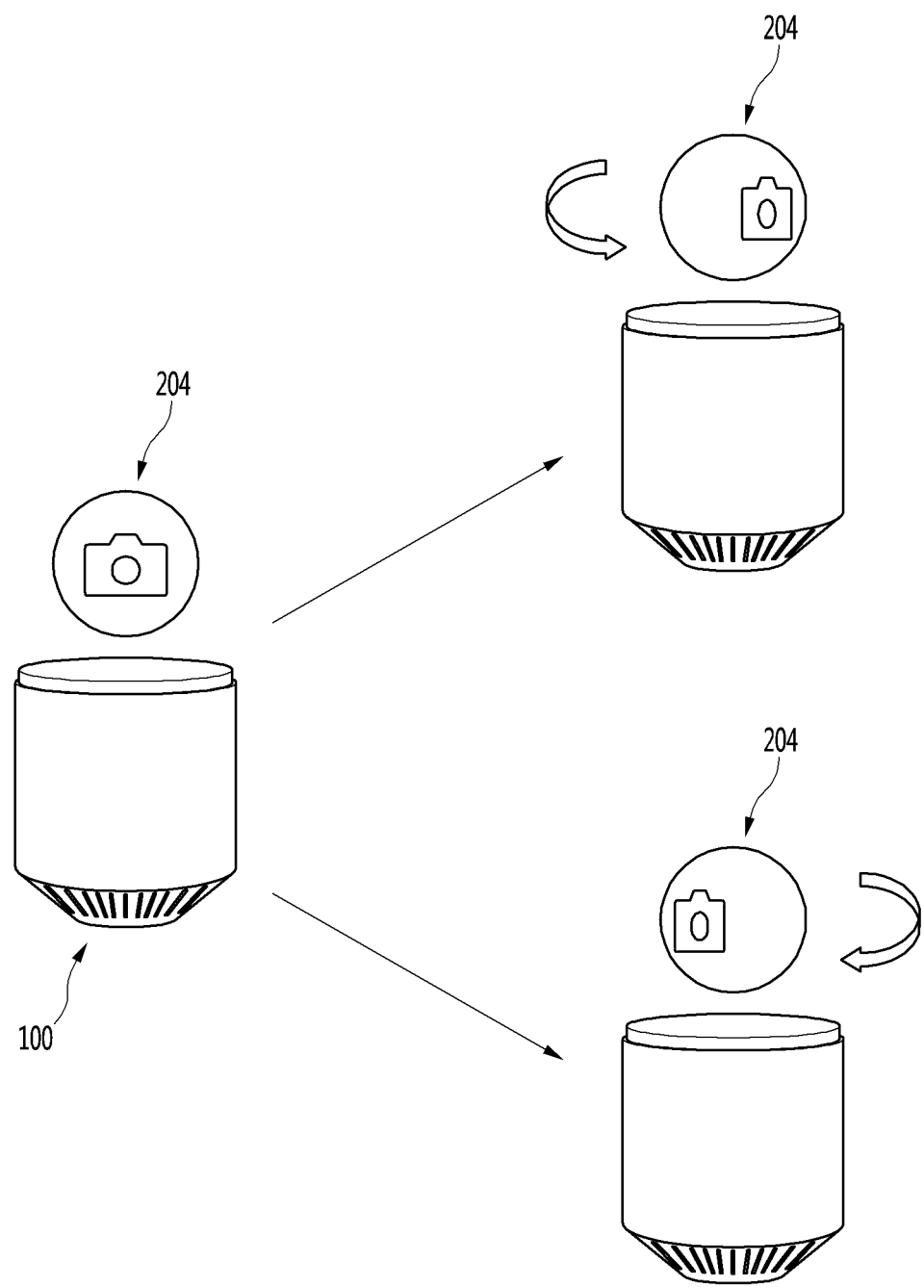
FIGS. 15 to 19 are diagrams for describing an example where a device module of a module type home robot according to the present invention is a camera module.

As illustrated in FIG. 15, the module type home robot according to the present invention may control a rotation of the camera module 204 by using a magnetic force between the main body 100 and the camera module 204.

As described above, based on an activation operation of each of the main body 100 and the camera module 204, the camera module 204 may be raised from the main body 100 by a certain height or more.

Moreover, in a state where the camera module 204 is floating in the air, the main body 100 may change magnetism to clockwise or counterclockwise rotate the camera module 204 at a certain angle.

By using a method of freely rotating the camera module 204 clockwise or counterclockwise, various embodiments in home will be described below with reference to FIGS. 16 to 19.

Figure 16:
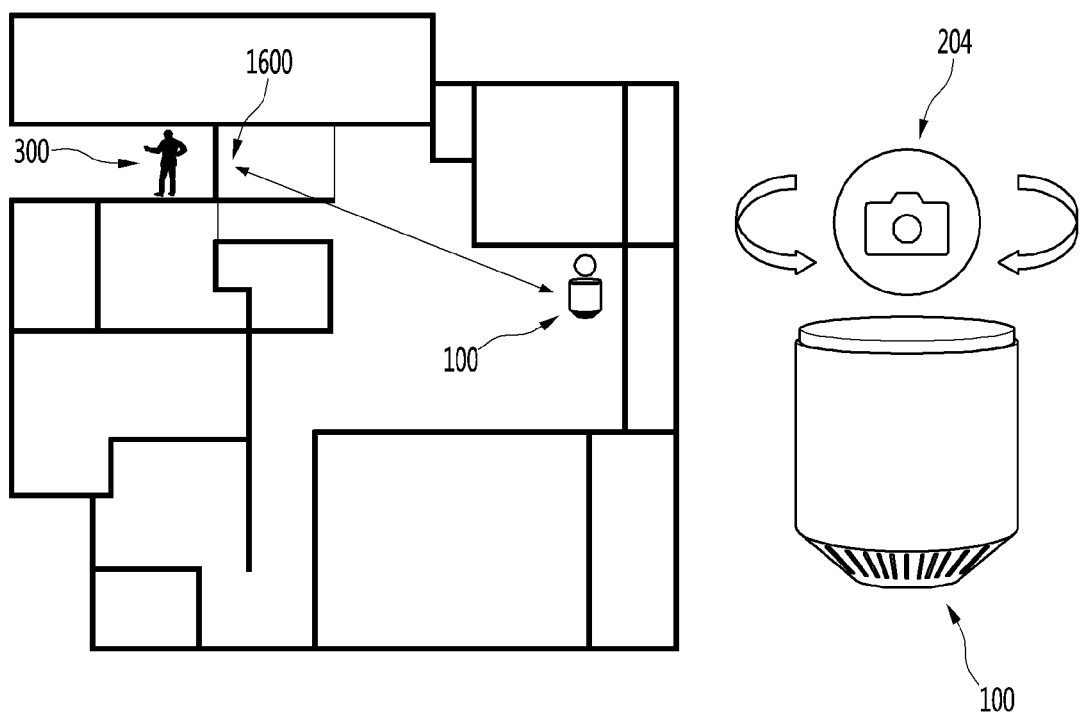

FIG. 16 is a diagram for describing an example where a module type home robot according to the present invention detects an entry of a user to operate as an in-home surveillance camera.

As illustrated in FIG. 16, the main body 100 may perform data communication with a front door 1600 by using in-home Internet of things (IoT) technology.

Moreover, by using a biometric sensor located in a porch, a user 300 may detect entry or exit of a user 300 through the front door 1600.

When information about where the user 300 exits through the front door 1600 is received, the main body 100 may operate in a security mode.

In the security mode, when the camera module 204 may overall photograph and record the inside of home in real time while rotating at 360 degrees at a predetermined period.

Therefore, even without a separate setting by the user 300, the inside of home may be photographed in real time during user's absence, thereby increasing security.

Figure 17:
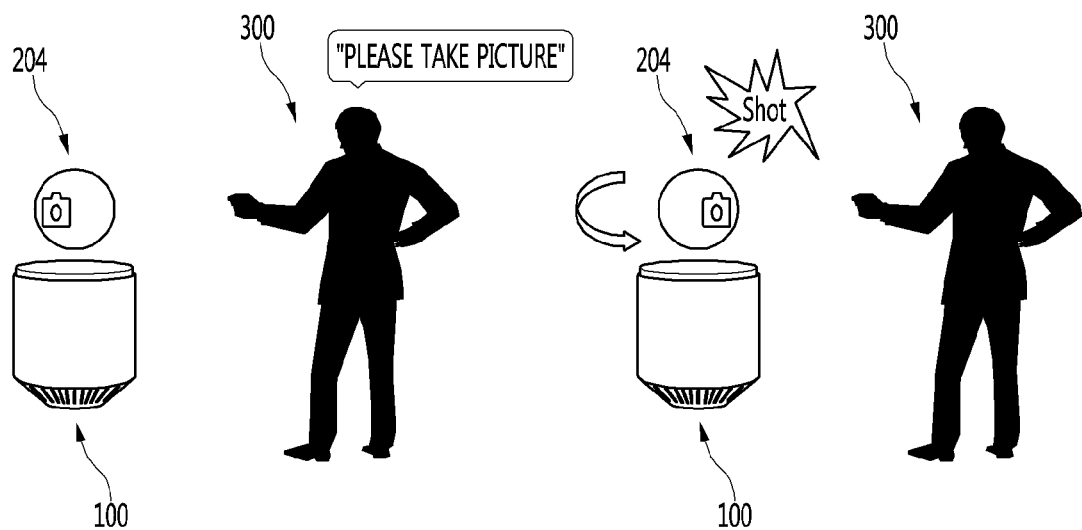

Furthermore, as illustrated in FIG. 17, the main body 100 may recognize a voice of the user 300.

The main body 100 which has recognized the voice of the user 300 may detect a position of the user 300 by using a PSD sensor.

Unlike a conventional IR sensor, the PSD sensor may be a photo sensor for detecting a position of the user 300. In the PSD sensor, a light receiving part may measure an angle of light reflected when infrared light is emitted from a light emitting lens, thereby detecting a distance.

The main body 100 may detect a position of the user 300 located near the main body 100, based on voice recognition information about the user 300 and by changing magnetism, the main body 100 may rotate the camera module 204 so as to face the user 300.

In this case, only when a voice recognition result recognized from the user 300 is the same as pre-stored voice recognition information, the camera module 204 may be set to rotate. For example, only when a message of the user 300 for requesting photographing is recognized through voice recognition, a corresponding operation may be performed.

In this case, based on user voice recognition, the main body 100 may allow a lens unit of the camera module 204 to face the user 300, and immediately, may control the camera module 204 to take a picture.

Figure 18:
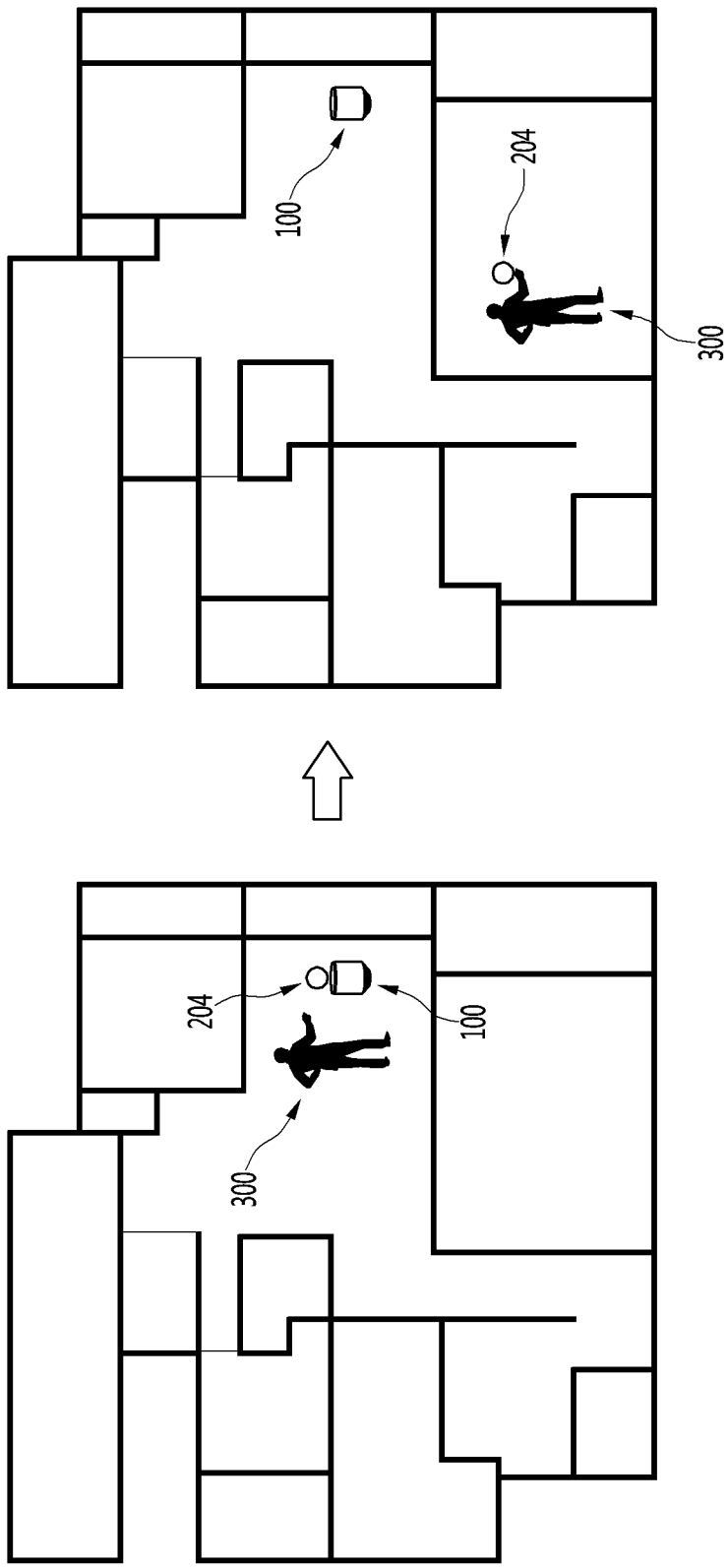
Figure 19:
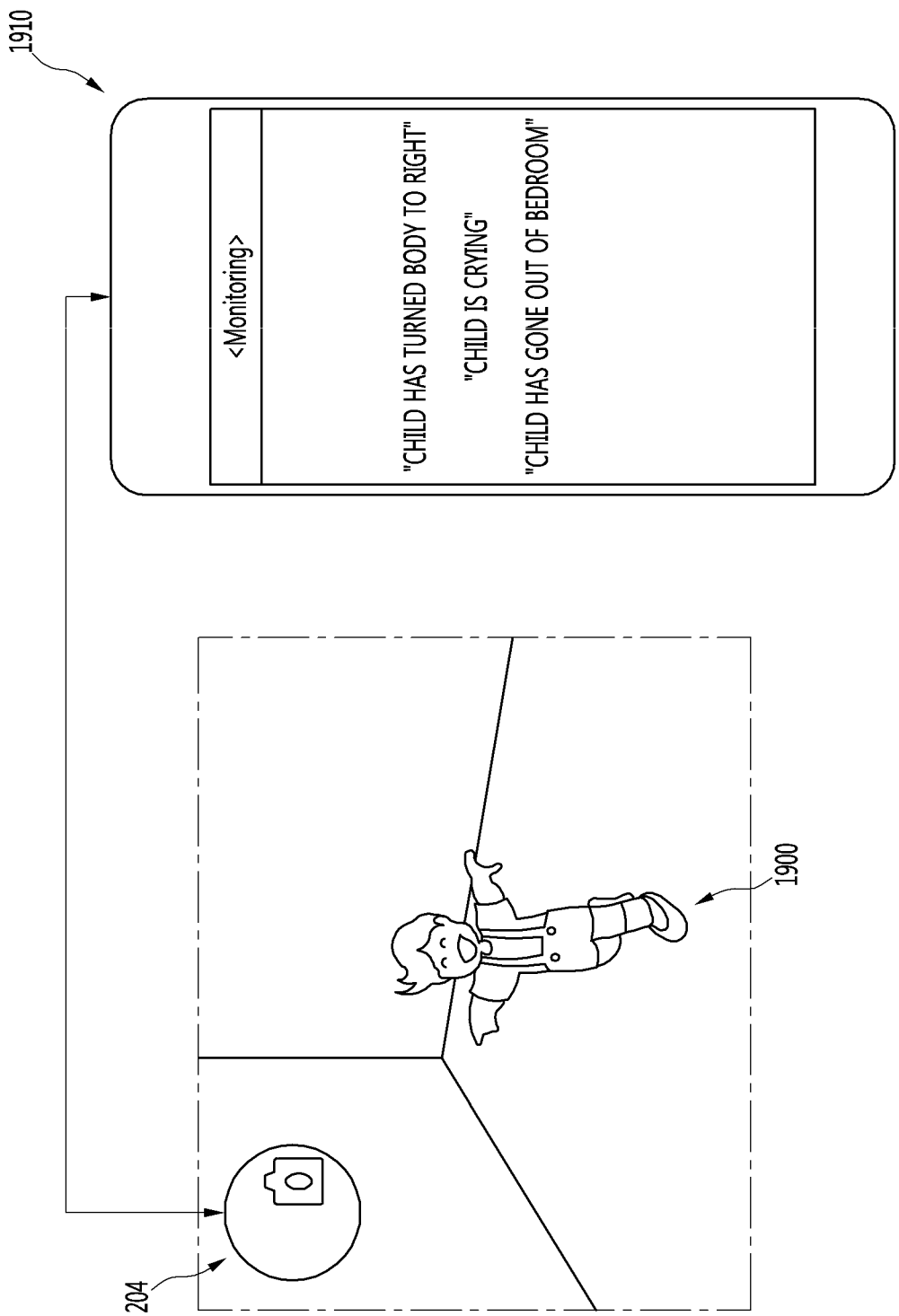

Moreover, as illustrated in FIGS. 18 and 19, the user 300 may separately move only the camera module 204 of the elements of the module type home robot. In the drawing, an example where the user 300 moves the camera module 204 from a living room to a bedroom is illustrated.

In this case, the main body 100 may perform remote communication with the camera module 204.

Moreover, the camera module 204 may be located in a certain space of the living room, and then, may detect an internal situation of the bedroom.

For example, when there is a bedroom user 1900, the camera module 204 may photograph the bedroom user 1900 in real time, and then, when a specific moving action is sensed, the camera module 204 may transmit corresponding content to a user mobile device 1910.

For example, in a case where the bedroom user 1900 is a child 1900, whenever the child 1900 makes a specific action, corresponding information may be transmitted to the user mobile device 1910, thereby allowing the user mobile device 1910 to perform a notification operation. In this case, the camera module 204 may directly transmit data to the user mobile device 1910. Alternatively, the data may be transmitted to the main body 100, and then, the main body 100 may transmit the data to the user mobile device 1910.

Figure 20:
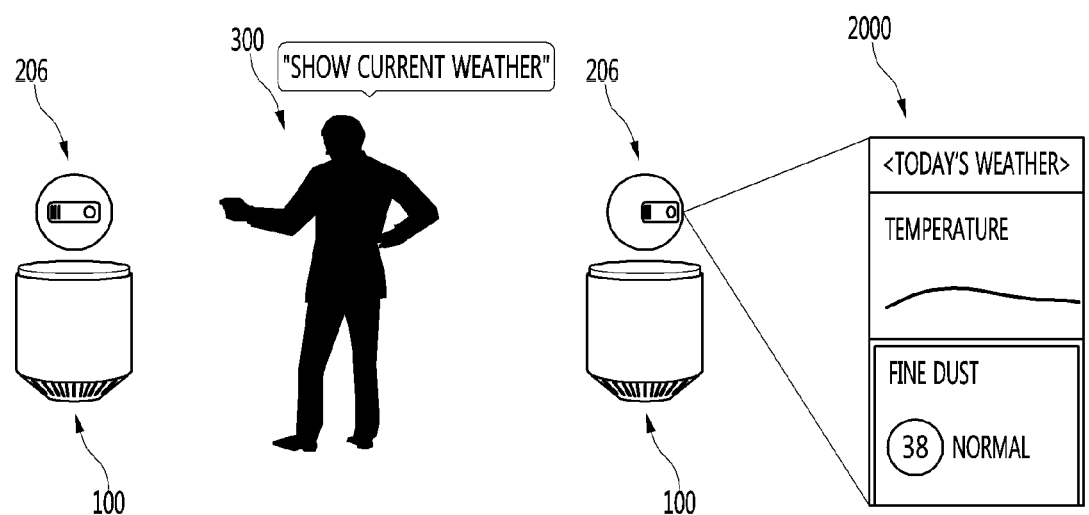
FIGS. 20 and 21 are diagrams for describing an example where a device module of a module type home robot according to the present invention is a projector module.
Figure 21:
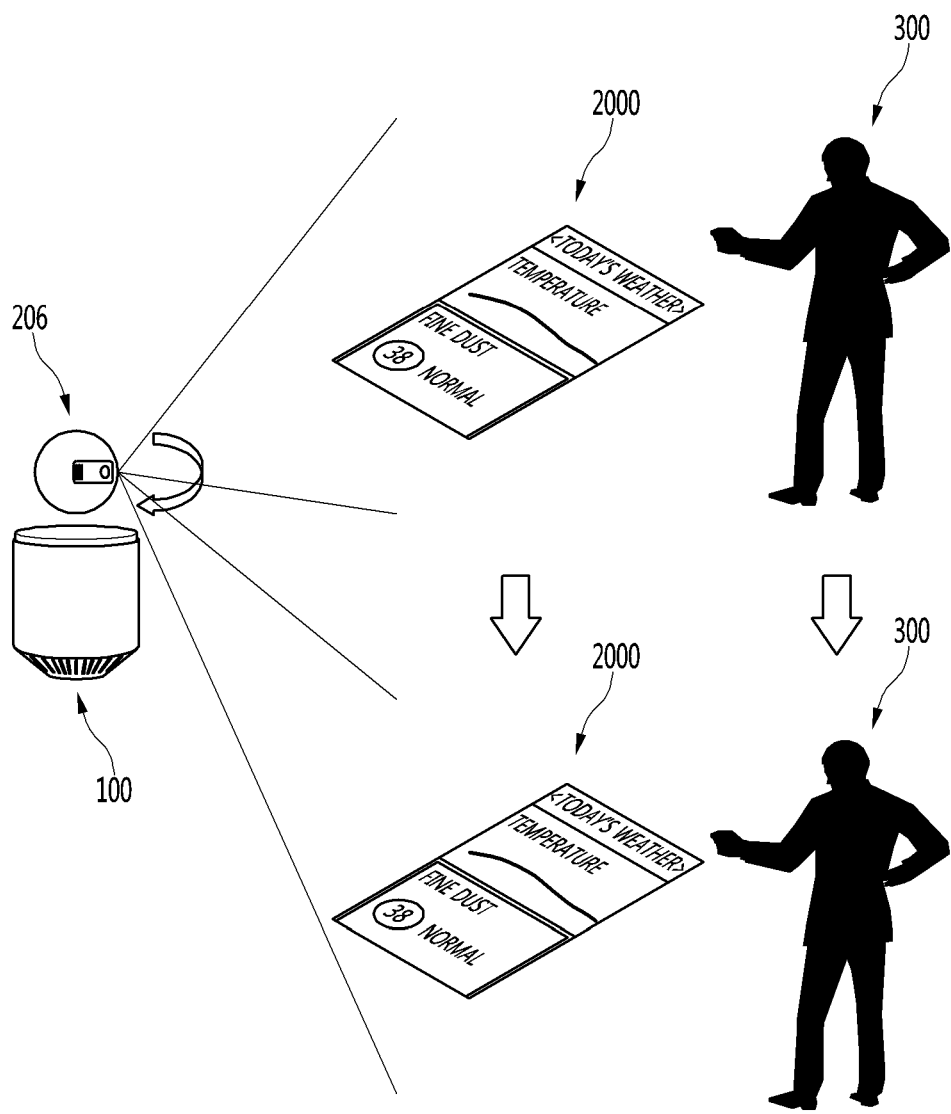

FIGS. 20 and 21 are diagrams for describing an example where a device module of a module type home robot according to the present invention is a projector module.

As illustrated in FIG. 20, a user 300 may input a projection request message by using a voice recognition function.

The main body 100 which has received the projection request message as a voice from the user may perform control to detect an ambient projection region by using a camera.

The main body 100 which has detected the projection region may rotate the projector module 206 by using a variation of magnetism as described above and may perform control to project projection content 2000 on the detected projection region.

Moreover, as illustrated in FIG. 21, the main body 100 or the projector module 206 may detect a movement of the user 300 in real time.

Furthermore, the main body 100 may rotate the projector module 206 according to the movement of the user 300, and thus, may perform control in order for the projection content 200 to be projected while moving along with the movement of the user 300.

Figure 22:
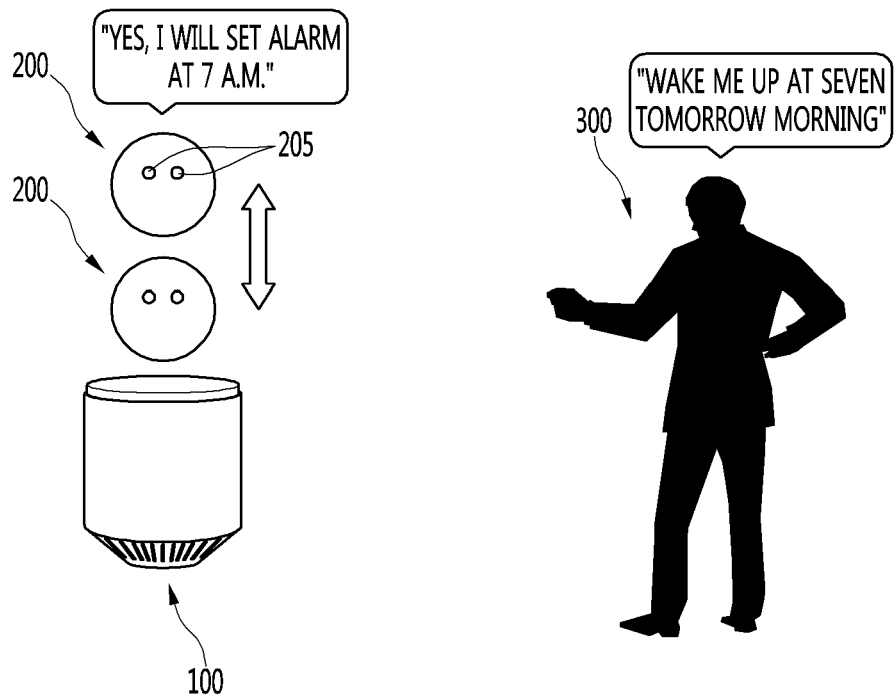
FIGS. 22 and 23 are diagrams for describing an additional embodiment of a module type home robot according to the present invention.
Figure 23:
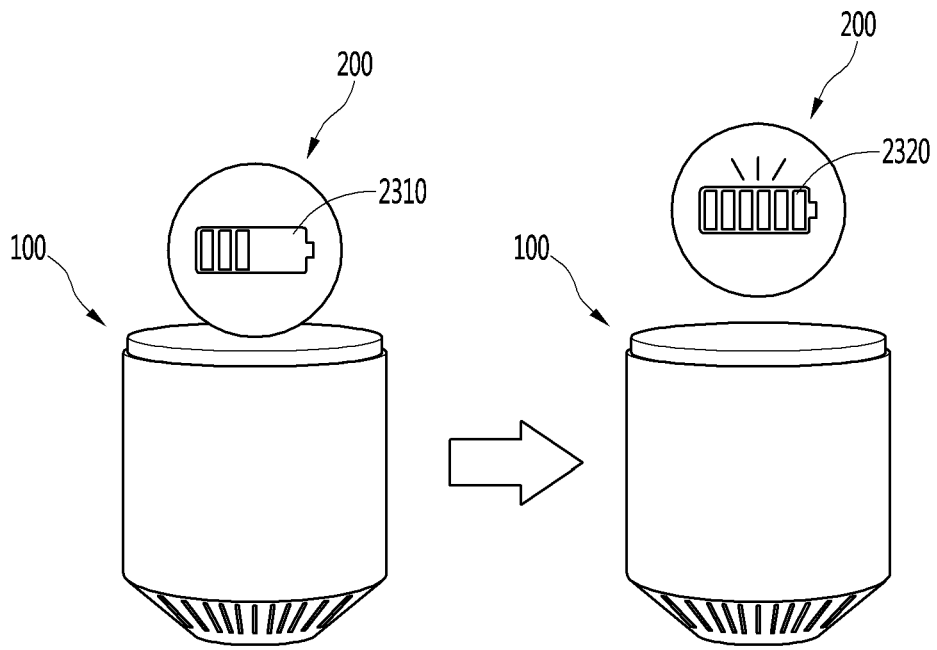

FIGS. 22 and 23 are diagrams for describing an additional embodiment of a module type home robot according to the present invention.

As illustrated in FIG. 22, a user 300 may input a command such as an alarm setting to the main body 100 through voice recognition.

The main body 100 which has received user voice recognition may perform control to upward and downward move the device module 200, for transferring a reception acknowledgement (ACK) message.

Moreover, by turning on an LED 205 equipped in the device module 200, an effect where eyes of the robot blink is obtained.

Moreover, the reception acknowledgement (ACK) message may be output as a voice through the speaker of the main body 100, and thus, the user 300 obtains an effect such as the user 300 actually performing communication with the robot.

Moreover, as illustrated in FIG. 22, the device module 200 may perform wireless charging by using the main body 100.

The device module 200 may perform wireless charging in a state where the device module 200 is floating in the air by a certain height or more as described above, in addition to a state where the device module 200 contacts an upper surface of the main body 100.

Moreover, the device module 200 may externally display a charged display image 2310 while charging is continuously performed, and may maintain the state where the device module 200 contacts the upper surface of the main body 100.

On the other hand, when charging of the device module 200 is completed, the main body 100 may control the device module 200 so that the device module 200 is raised by a certain height or more and a charging completion image 2320 is externally displayed.

Therefore, even when the user is located far away from the device module 200, the user can easily recognize that charging of the device module 200 is completed.

In the module type home robot according to the present invention, the configuration and method of the above-described embodiments are not restrictively applied, and all or some of the embodiments may be selectively combined to implement various modifications.

Effects of the present invention are as follows.

According to one embodiment of the various embodiments of the present invention, the module type home robot may be separated into the main body and the device module, the device module may be replaced, and different device modules may be replaced and used for various functions. Accordingly, the present invention provides consumers with a home robot for easily realizing a function desired by a user despite the purchase of one product.

According to another embodiment of the various embodiments of the present invention, the module type home robot may sense an ambient user in real time by using a proximity sensor or a voice recognition sensor and may automatically activate a plurality of functions according to a trigger signal, and thus, even without a separate input of the user, the module type home robot may be automatically activated and may perform an interaction with a user.

According to another embodiment of the various embodiments of the present invention, the module type home robot may autonomously sense a user absence environment to use, as a security function, some functions of a device module currently equipped therein, and thus, the module type home robot may autonomously perform a necessary function even in an environment where there is no user in home.

It will be apparent to those skilled in the art that various modifications and variations can be made in the present invention without departing from the spirit or scope of the disclosures. Thus, it is intended that the present invention covers the modifications and variations of this disclosure provided they come within the scope of the appended claims and their equivalents.

The invention claimed is:

1. A module-type home robot, comprising:
a plurality of components including:
at least one light emitting diode (LED) configured to emit light,
a camera configured to photograph and record,
a projector configured to project projection content, and
a dust sensing module configured to detect a dust concentration, the dust sensing module being configured to have magnetism and to be separately movable by a user upon being activated;
a device module coupling unit configured to couple to the plurality of components with the magnetism;
a main body on which the device module coupling unit is disposed, the main body comprising:
a communication interface configured to communicate with the plurality of components;
an input unit configured to receive a user input;
an output unit configured to output voice and images;
a sensing unit configured to sense the user; and
a control unit configured to:
receive a trigger signal for at least one of the plurality of components, the trigger signal including at least one of a user proximity signal, a user voice signal, a user movement signal, a specific time sensing signal or an environment change sensing signal;
activate the at least one of the plurality of components or the output unit according to the received trigger signal to perform a function corresponding to the at least one of the plurality of components; and
adjust the magnetism to raise the at least one of the plurality of components to a certain height from the device module coupling unit,
wherein the dust sensing module includes a dust sensor for sensing the dust concentration in real time and, based on the sensed dust concentration, transmitting the trigger signal to the control unit based on the trigger signal being the environment change sensing signal, and
wherein the control unit is further configured to:
output the dust concentration information via a voice message based on the sensed dust concentration being equal to or higher than a predetermined level; and
control the communication interface to communicate with a window control device to close a window in response to a received window control voice command.

2. The home robot of claim 1, wherein
the received trigger signal is the user proximity signal; and
the control unit is further configured to raise the at least one of the plurality of components from the device module coupling unit based on the user proximity signal indicating that the user is sensed at a certain distance.

3. The home robot of claim 2, wherein the control unit is further configured to control the output unit to output a predetermined voice message.

4. The home robot of claim 2, wherein the at least one of the plurality of components is further configured to control the at least one LED to emit the light based on the at least one of the plurality of components being raised by at least a certain distance from the device module coupling unit.

5. The home robot of claim 4, wherein the control unit is further configured to control the at least one of the plurality of components to rotate such that the at least one LED faces the user.

6. The home robot of claim 1, wherein
the received trigger signal is the specific time sensing signal; and
the control unit is further configured to activate a voice recognition operation by using the input unit and the output unit and to control the output unit to output a predetermined voice message mapped to a specific time indicated by the specific time sensing signal.

7. The home robot of claim 6, wherein the control unit is further configured to convert the predetermined voice message into a message for a mobile device and to control the communication interface to transmit the converted message to the mobile device.

8. The home robot of claim 1, wherein the control unit is further configured to control the communication interface to communicate with a window control device to close a window based on the sensed dust concentration.

9. The home robot of claim 1, wherein the control unit is further configured to control an air cleaner in response to a received air cleaner voice command.

10. The home robot of claim 1, wherein:
the trigger signal is for the camera and is the user movement signal; and
the control unit is further configured to control the camera to rotate by 360 degrees, to control the camera to photograph inside a home in which the home robot is located based on the user movement signal indicating that the user is no longer in the home and to store photographed information.

11. The home robot of claim 1, wherein
the trigger signal is for the projector and is the user voice signal; and
the control unit is further configured to detect a projection region near the user and to control the projector to rotate such that it faces the detected projection region based on a variation of magnetism based on the user voice signal being a projection request.

12. The home robot of claim 11, wherein
the trigger signal is the user movement signal; and
the control unit is further configured to simultaneously track the user and control the projector to rotate based on the user movement signal indicating user movement while the projector is performing projection.

13. The home robot of claim 1, wherein the device module coupling unit includes a wireless charging device to enable the plurality of components to be charging in a state where the plurality of components is floating in the air by a certain height or in a state where the plurality of components contacts an upper surface of the main body.

14. The home robot of claim 1, wherein any one of the plurality of components coupled with the device module coupling unit is replaceable with other components.

15. The home robot of claim 1, wherein the control unit of main body controls an operation of in-home Internet of things (IoT) and the home robot further comprises a memory storing application programs.

16. The home robot of claim 1, wherein the plurality of components and device module coupling unit have magnetic properties to facilitate raising the plurality of components.

17. The home robot of claim 1, wherein the output unit includes at least a display device and an audio device.

18. The home robot of claim 1, wherein the communication interface configured to perform wireless communication.

* * * * *